United States Patent
Choi

(10) Patent No.: US 12,308,668 B2
(45) Date of Patent: May 20, 2025

(54) WIRELESS POWER RECEIVING APPARATUS FOR CARRYING OUT IN-BAND COMMUNICATION WITH WIRELESS POWER TRANSMITTING APPARATUS AND METHOD FOR CARRYING OUT IN-BAND COMMUNICATION IN WIRELESS POWER RECEIVING APPARATUS

(71) Applicant: Samsung Electronics Co., Ltd., Suwon-si (KR)

(72) Inventor: Hangseok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 18/469,784

(22) Filed: Sep. 19, 2023

(65) Prior Publication Data

US 2024/0014693 A1   Jan. 11, 2024

Related U.S. Application Data

(63) Continuation of application No. PCT/KR2022/003462, filed on Mar. 11, 2022.

(30) Foreign Application Priority Data

Mar. 26, 2021 (KR) ........................ 10-2021-0039974

(51) Int. Cl.
*H02J 50/80* (2016.01)
*H02J 50/12* (2016.01)
*H04B 5/79* (2024.01)

(52) U.S. Cl.
CPC .............. *H02J 50/80* (2016.02); *H02J 50/12* (2016.02); *H04B 5/79* (2024.01)

(58) Field of Classification Search
CPC .............. H02J 50/12; H02J 50/80; H04B 5/79
See application file for complete search history.

(56) References Cited

U.S. PATENT DOCUMENTS

2009/0284082 A1   11/2009   Mohammadian
2011/0193417 A1   8/2011   Hirasaka et al.
(Continued)

FOREIGN PATENT DOCUMENTS

| CA | 3121885 A1 | 6/2020 |
|----|------------|--------|
| CN | 109462289 A | 3/2019 |

(Continued)

OTHER PUBLICATIONS

International Search Report dated Jun. 20, 2022, issued in International Patent Application No. PCT/KR2022/003462.
(Continued)

*Primary Examiner* — Rexford N Barnie
*Assistant Examiner* — David A Shiao
(74) *Attorney, Agent, or Firm* — Jefferson IP Law, LLP

(57) ABSTRACT

A wireless power receiving apparatus is provided. The wireless power receiving apparatus includes a resonance circuit configured to receive wireless power from a wireless power transmitting apparatus, a plurality of first capacitors, a plurality of first switches, a plurality of second capacitors, a plurality of second switches, a rectifier circuit connected to a first end and a second end of the resonance circuit, and a control circuit connected to the rectifier circuit, wherein the control circuit may be configured to select, based on a control error packet (CEP) value identified based on an output of the rectifier circuit, switches for modulating data to be transmitted to the wireless power transmitting apparatus, among the plurality of first switches and the plurality of second switches, and control on/off of the selected switches based on modulation of the data.

19 Claims, 10 Drawing Sheets

(56) References Cited

U.S. PATENT DOCUMENTS

| | | |
|---|---|---|
| 2013/0043737 A1 | 2/2013 | Yeo et al. |
| 2015/0008755 A1 | 1/2015 | Sone |
| 2015/0180265 A1 | 6/2015 | Chiang et al. |
| 2017/0012470 A1* | 1/2017 | Nakano ............... H02J 7/00034 |
| 2017/0110913 A1 | 4/2017 | Shin et al. |
| 2017/0201127 A1* | 7/2017 | Jung ....................... H02J 50/80 |
| 2017/0346344 A1 | 11/2017 | Uchimoto |
| 2018/0062422 A1 | 3/2018 | Kim et al. |
| 2018/0131234 A1 | 5/2018 | Uchimoto |
| 2020/0044491 A1 | 2/2020 | Qiu et al. |
| 2020/0274402 A1 | 8/2020 | Hwang et al. |
| 2021/0194285 A1* | 6/2021 | Park ....................... H02J 50/80 |
| 2021/0218264 A1 | 7/2021 | Pei |
| 2022/0069635 A1* | 3/2022 | Gu .......................... H02J 50/80 |
| 2023/0129480 A1* | 4/2023 | Hong ..................... H02J 50/80 |
| | | 307/104 |

FOREIGN PATENT DOCUMENTS

| | | |
|---|---|---|
| JP | 2017-216816 A | 12/2017 |
| JP | 2017-216817 A | 12/2017 |
| KR | 10-2012-0138828 | 12/2012 |
| KR | 10-2013-0020437 A | 2/2013 |
| KR | 10-2016-0121347 A | 10/2016 |
| KR | 10-2017-0044495 A | 4/2017 |
| KR | 10-2018-0012675 A | 2/2018 |
| KR | 10-2018-0024786 A | 3/2018 |

OTHER PUBLICATIONS

Extended European Search Report dated Aug. 9, 2024, issued in European Application No. 22775955.2-1206.

* cited by examiner

WIRELESS POWER RECEIVING APPARATUS FOR CARRYING OUT IN-BAND COMMUNICATION WITH WIRELESS POWER TRANSMITTING APPARATUS AND METHOD FOR CARRYING OUT IN-BAND COMMUNICATION IN WIRELESS POWER RECEIVING APPARATUS

CROSS-REFERENCE TO RELATED APPLICATION(S)

This application is a continuation application, claiming priority under § 365(c), of an International application No. PCT/KR2022/003462, filed on Mar. 11, 2022, which is based on and claims the benefit of a Korean patent application number filed on Mar. 26, 2021, in the Korean Intellectual Property Office, the disclosure of which is incorporated by reference herein in its entirety.

BACKGROUND

1. Field

The disclosure relates to a wireless power reception device performing in-band communication with a wireless power transmission device and a method for performing in-band communication in a wireless power reception device.

2. Description of Related Art

The wireless power transmission technology using the magnetic induction scheme is a scheme for transferring power by the electromagnetic field induced in the coil. The wireless power transmitting device applies a current to the transmission coil to generate an electromagnetic field, and an induced current is formed in the reception coil of the wireless power receiving device, so that power may be wirelessly transmitted. Wireless power transmission technology may contribute to convenience in that there is no need to connect the charging terminals to the electronic device.

When receiving wireless power from the wireless power transmission device, the wireless power reception device may transmit a signal to the wireless power transmission device through in-band communication to control the received wireless power. An additional resonance element may be connected to the resonance circuit of the wireless power reception device and, as the additional resonance element is connected, the current flowing through the transmission coil of the wireless power transmission device and/or the voltage across the transmission coil may change. The wireless power transmission device may obtain the signal by performing demodulation on the current flowing through the transmission coil and/or the voltage across the transmission coil. The process of changing the current flowing through the transmission coil of the wireless power transmission device and/or the voltage across the transmission coil by controlling the connection between the resonance circuit and the additional resonance element in the wireless power reception device may be referred to as a process of transmitting an in-band communication signal to the wireless power transmission device. The wireless power transmission device may control wireless power transmitted to the wireless power reception device based on the signal obtained from the wireless power reception device through in-band communication.

The above information is presented as background information only to assist with an understanding of the disclosure. No determination has been made, and no assertion is made, as to whether any of the above might be applicable as prior art with regard to the disclosure.

SUMMARY

One or more modulation capacitors for performing in-band communication may be connected to the resonance circuit of the wireless power reception device. When the capacitance of the modulation capacitor is large, the current flowing through the transmission coil of the wireless power transmission device and/or the voltage across the transmission coil may be greatly changed. In other words, when the capacitance of the modulation capacitor is large, a signal having a large amplitude may be transferred to the wireless power transmission device. However, when the capacitance of the modulation capacitor is large, overshoot of the voltage output from the rectification circuit of the wireless power reception device increases, resulting in increased voltage stress in the rectification circuit and increased loss in the regulator. Further, audible noise may occur as perturbation of the audible frequency band periodically occurs in the in-band signal.

Due to the non-linear characteristics of the resonance system, even when the capacitance of the modulation capacitor is the same, the amplitude of the demodulation signal that may be obtained by performing demodulation on the current flowing through the transmission coil and/or the voltage across the transmission coil in the wireless power transmission device may vary depending on the load conditions and the switching frequency.

The wireless power reception device according to various embodiments may include a plurality of capacitors connected to the resonance circuit and may select a combination of modulation capacitors based on the control error packet (CEP) value identified based on the output of the resonance circuit.

Aspects of the disclosure are to address at least the above-mentioned problems and/or disadvantages and to provide at least the advantages described below. Accordingly, an aspect of the disclosure is to provide a wireless power receiving apparatus for carrying out in band communication with wireless power transmitting apparatus and method for carrying out in-band communication in wireless power receiving apparatus.

Additional aspects will be set forth in part in the description which follows and, in part, will be apparent from the description, or may be learned by practice of the presented embodiments.

In accordance with an aspect of the disclosure, a wireless power reception device is provided. The wireless power reception device includes a resonance circuit configured to receive wireless power from a wireless power transmission device, a plurality of first capacitors, a plurality of first switches, a plurality of second capacitors, a plurality of second switches, a rectification circuit connected to a first end and a second end of the resonance circuit, and a control circuit connected to the rectification circuit. Each of first ends of the plurality of first capacitors may be connected to the first end of the resonance circuit, second ends of the plurality of first capacitors may be respectively connected to first ends of the plurality of first switches, and second ends of the plurality of first switches may be connected to a ground. Each of first ends of the plurality of second capacitors may be connected to the second end of the resonance circuit, second ends of the plurality of second capacitors may be respectively connected to first ends of the plurality of second switches, and second ends of the plurality of second switches may be connected to the ground. The control circuit may be configured to select switches for modulating data to be transmitted to the wireless power transmission device among the plurality of first switches and the plurality of second switches based on a CEP value identified based on an output of the rectification circuit and control on/off of the selected switches based on modulation of the data.

In accordance with another aspect of the disclosure, a method performed by a wireless power reception device including a resonance circuit, a plurality of first capacitors, a plurality of first switches, a plurality of second capacitors, and a plurality of second switches, wherein each of first ends of the plurality of first capacitors is connected to the first end of the resonance circuit, second ends of the plurality of first capacitors are respectively connected to first ends of the plurality of first switches, and second ends of the plurality of first switches are connected to a ground, wherein each of first ends of the plurality of second capacitors is connected to the second end of the resonance circuit, second ends of the plurality of second capacitors are respectively connected to first ends of the plurality of second switches, and second ends of the plurality of second switches are connected to the ground is provided. The method including identifying a CEP value based on an output of a rectification circuit of the wireless power reception device, selecting switches for modulating data to be transmitted to a wireless power transmission device among the plurality of first switches and the plurality of second switches based on the CEP value, and controlling on/off of the selected switches based on the modulation of the data.

According to various embodiments of the disclosure, a wireless power reception device performing in-band communication with a wireless power transmission device and a method for performing in-band communication in a wireless power reception device are provided. The wireless power reception device includes a plurality of capacitors connected to the resonance circuit and may select a combination of modulation capacitors based on the CEP value identified based on the output of the resonance circuit. The wireless power reception device according to various embodiments may determine whether wireless power is properly controlled through in-band communication based on the CEP value and, accordingly, adaptively select a combination of modulation capacitors. Therefore, the wireless power reception device according to various embodiments may maintain the minimum capacitance of the modulation capacitors within a range in which smooth in-band communication is possible, making it possible to minimize the voltage stress of the resonance circuit and the loss in the regulator and properly control wireless power while mitigating audible noise.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
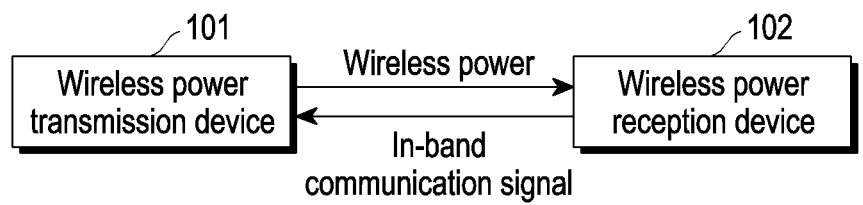
FIG. 1 is a block diagram illustrating a wireless power transmission device and a wireless power receiving device according to an embodiment of the disclosure.

FIG. 1 is a block diagram illustrating a wireless power transmission device and a wireless power receiving device according to an embodiment of the disclosure.

Referring to FIG. 1, a wireless power transmission device 101 according to various embodiments may transmit wireless power to a wireless power reception device 102. According to various embodiments of the disclosure, the wireless power transmission device 101 may transmit wireless power to the wireless power reception device 102 according to an induction scheme. When the wireless power transmission device 101 transmits wireless power to the wireless power reception device 102 by the induction scheme, the wireless power transmitting device 101 may include at least one of, e.g., a power source, a direct current (DC)-alternating current (AC) converting circuit, an amplifying circuit, an impedance matching circuit, at least one capacitor, at least one coil, and a communication modulation/demodulation circuit. The at least one capacitor together with the at least one coil may constitute a resonance circuit. The wireless power transmitting device 101 may be implemented in a scheme defined in the wireless power consortium (WPC) standards (or Qi standards).

According to various embodiments of the disclosure, the wireless power transmission device 101 may include a transmission coil for transmitting wireless power. As current is applied to the transmission coil, the transmission coil may generate an induced magnetic field. The wireless power reception device 102 may include a reception coil for receiving wireless power. According to the change in the induced magnetic field generated by the transmission coil, an induced current may flow between two opposite ends of the reception coil. The process of generating an induced magnetic field by the wireless power transmission device 101 may be represented as transmitting wireless power to the wireless power reception device 102 by the wireless power transmission device 101. The process in which the induced current is rendered to flow between two opposite ends of the wireless power reception device 102 according to the change in the induced magnetic field generated by the wireless power transmission device 101 may be represented as receiving wireless power from the wireless power transmission device 101 by the wireless power reception device 102.

According to various embodiments of the disclosure, the wireless power reception device 102 may transmit an in-band communication signal to the wireless power transmission device 101. The wireless power reception device 102 may transmit a signal indicating information related to wireless power received from the wireless power transmission device 101 to the wireless power reception device 102 using in-band communication. According to various embodiments of the disclosure, the in-band communication signal may indicate a value based on a difference between an output voltage of the rectifier circuit of the wireless power reception device 102 and a target voltage. The in-band communication signal may indicate, e.g., a control error packet (CEP) value based on a difference between an output voltage of the rectification circuit of the wireless power reception device 102 and the target voltage.

The wireless power transmission device 101 may control wireless power transmitted to the wireless power reception device 102 based on the in-band communication signal. According to various embodiments of the disclosure, the wireless power transmission device 101 may control wireless power by controlling a switching frequency and/or a pulse width modulation (PWM) duty cycle.

According to an embodiment of the disclosure, the wireless power reception device 102 may select a combination of modulation capacitors to be used to transmit the in-band communication signal based on the wireless power received from the wireless power transmission device 101. According to various embodiments of the disclosure, the wireless power reception device 102 may select a combination of modulation capacitors to be used to transmit an in-band communication signal, based on a CEP value. As combinations of modulation capacitors having different capacitances are used to transmit the in-band communication signal, the amplitude of the in-band communication signal may vary.

Figure 2:
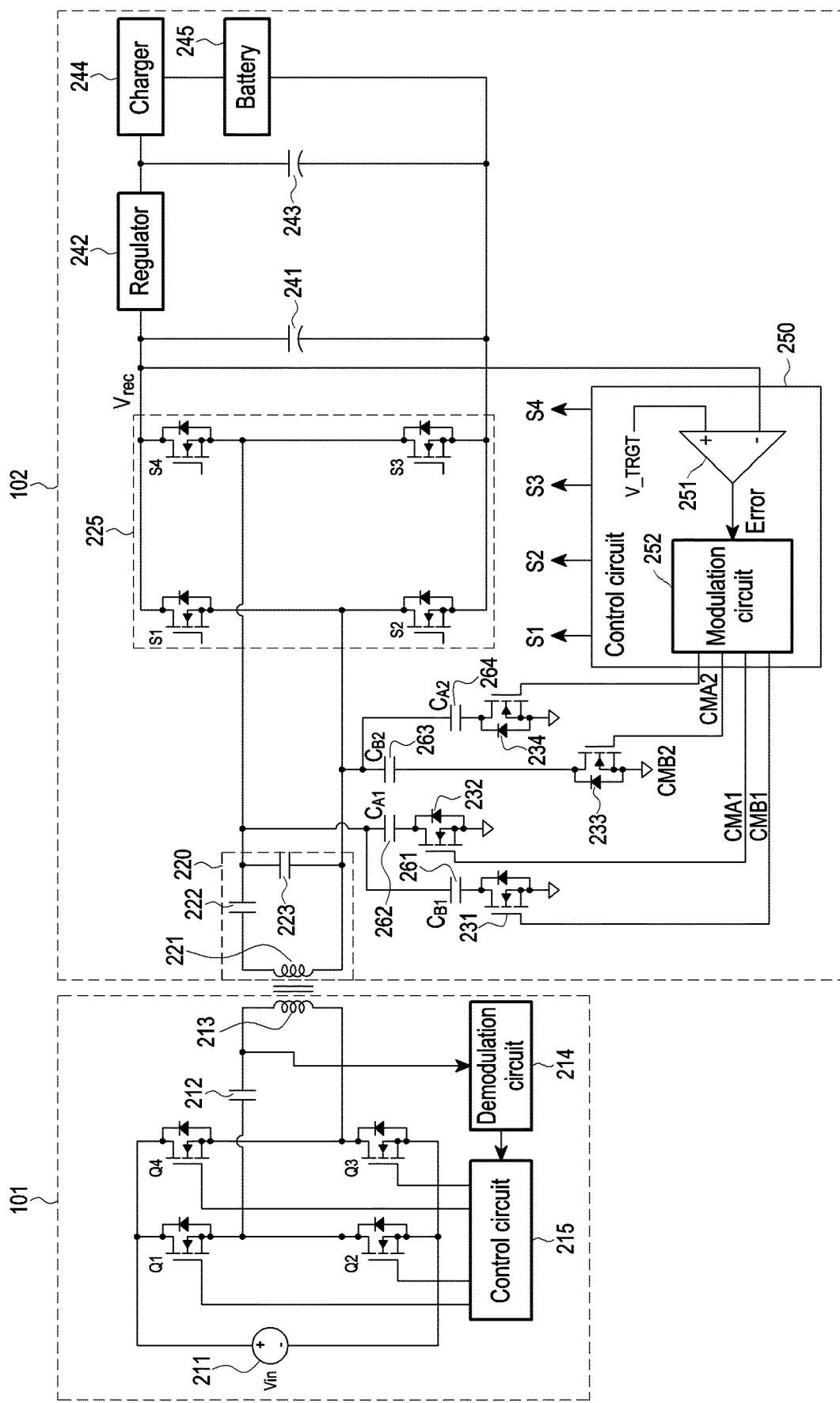
FIG. 2 is a view illustrating a configuration of a wireless power transmission device and a wireless power reception device according to an embodiment of the disclosure.

FIG. 2 is a view illustrating a configuration of a wireless power transmission device and a wireless power reception device according to an embodiment of the disclosure.

Referring to FIG. 2, the wireless power transmission device 101 may include a power source 211, a plurality of switches Q1, Q2, Q3, and Q4, a capacitor 212, a transmission coil 213, a demodulation circuit 214, and a control circuit 215.

According to various embodiments of the disclosure, the DC power provided by the power source 211 may be converted into the AC power by the plurality of switches Q1, Q2, Q3, and Q4 constituting a full bridge circuit. One end of the transmission coil 213 may be connected to a connection point between the switches Q1 and Q2 through the capacitor 212, and the other end of the transmission coil 213 may be connected to the connection point between the switches Q3 and Q4. The control circuit 215 may control on/off states of the plurality of switches Q1, Q2, Q3, and Q4 such that DC power provided by the power source 211 may be converted into AC power.

The AC power converted by the plurality of switches Q1, Q2, Q3, and Q4 may be applied to the transmission coil 213. The transmission coil 213 may form a magnetic field based on the applied AC power. Part of the magnetic field formed by the transmission coil 213 may pass through the cross section of a reception coil 221 of the wireless power reception device 102. As the magnetic field passing through the cross section of the reception coil 221 is changed over time, an induced current may flow through the reception coil 221.

According to various embodiments of the disclosure, the demodulation circuit 214 may demodulate the voltage $V_{LC\_TX}$ across the transmission coil 213 to output the demodulation signal $V_{demod}$. An example of the configuration of the demodulation circuit 214 is described below with reference to FIG. 3.

According to various embodiments of the disclosure, the control circuit 215 may control the wireless power transmitted to the wireless power reception device 102 by controlling the frequency at which the on/off state of the plurality of switches Q1, Q2, Q3, and Q4 is switched based on the demodulation signal $V_{demod}$ output by the demodulation circuit 214. According to various embodiments of the disclosure, the control circuit 215 may control the wireless power by controlling the PWM duty cycle based on the demodulation signal $V_{demod}$.

According to various embodiments of the disclosure, the wireless power reception device 102 may include a resonance circuit 220, a rectification circuit 225, a control circuit 250, a plurality of first capacitors 261 and 262, a plurality of first switches 231 and 232, a plurality of second capacitors 263 and 264, a plurality of second switches 233 and 234, a capacitor 241, a regulator 242, a capacitor 243, a charger 244, and a battery 245.

According to various embodiments of the disclosure, the resonance circuit 220 may include a reception coil 221, a capacitor 222, and a capacitor 223. One end of the capacitor 222 may be connected to the reception coil 221, and the other end of the capacitor 222 may be connected to one end of the capacitor 223 and one end of the rectification circuit 225. One end of the capacitor 223 may be connected to the other end of the capacitor 222, and the other end of the capacitor 223 may be connected to the other end of the reception coil 221. In other words, the capacitor 223 may be connected in parallel to a circuit formed by connecting the reception coil 221 and the capacitor 222 in series. The other end of the capacitor 223 may be connected to the other end of the rectification circuit 225.

According to various embodiments of the disclosure, the rectification circuit 225 may include a plurality of switches S1, S2, S3, and S4 constituting the full bridge circuit. One end of the resonance circuit 220 may be connected to a connection point between the switches S1 and S2, and the other end of the resonance circuit 220 may be connected to the connection point between the switches S3 and S4. The rectification circuit 225 may convert the AC-type wireless power received through the resonance circuit 220 into DC power. The control circuit 250 may control the on/off state of the plurality of switches S1, S2, S3, and S4 such that the AC-type wireless power received through the resonance circuit 220 may be converted into DC power.

According to various embodiments of the disclosure, the capacitor 241 and the regulator 242 may be connected to the rectification circuit 225. One end of the capacitor 241 may be grounded. The regulator 242 may perform converting (e.g., buck converting and/or boost converting) and/or regulating on the voltage of the rectified power output from the power conversion circuit. According to an implementation, the regulator 242 may be referred to as a DC/DC converter or may not be included in the wireless power reception device 102.

According to various embodiments of the disclosure, the charger 244 may charge the battery 245 with the power converted and/or regulated by the regulator 242. According to various embodiments of the disclosure, the charger 244 may control the voltage and/or current for charging the battery 245 according to the charging mode (e.g., CC mode, CV mode, or quick charging mode) of the battery 245.

According to various embodiments of the disclosure, the control circuit 250 may control the plurality of first switches 231 and 232 and the plurality of second switches 233 and 234 based on the voltage $V_{rec}$ of the output end of the rectification circuit 225. According to various embodiments of the disclosure, the control circuit 250 may include a comparator 251 and a modulation circuit 252. The comparator 251 may compare the voltage $V_{rec}$ at the output end of the rectification circuit 225 with the target voltage V_TRGT, and transmit an error between the voltage $V_{rec}$ at the output end of the rectification circuit 225 and the target voltage V_TRGT to the modulation circuit 252.

According to an embodiment of the disclosure, the modulation circuit 252 may select switches for modulating data to be transmitted to the wireless power transmission device 101 from among the plurality of first switches 231 and 232 and the plurality of second switches 233 and 234 based on the error between the voltage $V_{rec}$ at the output end of the rectification circuit 225 and the target voltage V_TRGT. For example, the modulation circuit 252 may select at least one switch from among the plurality of first switches 231 and 232, and may select at least one switch from among the plurality of second switches 233 and 234. According to various embodiments of the disclosure, the modulation circuit 252 may select the first switch 231 and the second switch 233, may select the first switch 232 and the second switch 234, or may select both the plurality of first switches 231 and 232 and both the plurality of second switches 233 and 234.

The modulation circuit 252 may control non-selected switches among the plurality of first switches 231 and 232 and the plurality of second switches 233 and 234 to turn off. The modulation circuit 252 may control on/off of switches selected based on data to be transmitted to the wireless power transmission device 101, and the data may be modulated under the control of the modulation circuit 252. As the switches selected from among the plurality of first switches 231 and 232 and the plurality of second switches 233 and 234 are repeatedly turned on/off, the modulation capacitors connected to the switches selected from among the plurality of first capacitors 261 and 262 and the plurality of second capacitors 263 and 264 may be repeatedly connected to and disconnected from the resonance circuit 220. The operation of repeating the on/off of the switches selected from the plurality of first switches 231 and 232 and the plurality of second switches 233 and 234 in the modulation circuit 252 may be referred to as a process in which the wireless power reception device 102 transmits an in-band communication signal. As the modulation capacitors are repeatedly connected to and disconnected from the resonance circuit 220, the voltage $V_{LC\_TX}$ across the transmission coil 213 may change. As described above, the voltage $V_{LC\_TX}$ across the transmission coil 213 may be input to the demodulation circuit 214 to be demodulated.

According to various embodiments of the disclosure, the capacitances of the modulation capacitors may vary depending on the selection of the switches. For example, when the first switch 231 and the second switch 233 are selected, the first capacitor 261 connected to the first switch 231 and the second capacitor 263 connected to the second switch 233 may be modulation capacitors. According to various embodiments of the disclosure, the capacitance $C_{A1}$ of the first capacitor 262 may be smaller than the capacitance $C_{B1}$ of the first capacitor 261, and the capacitance $C_{A2}$ of the second capacitor 264 may be smaller than the capacitance $C_{B2}$ of the second capacitor 263. When the first switch 231 and the second switch 233 are selected, the capacitances of the modulation capacitors may be larger than the capacitances of the modulation capacitors when the first switch 232 and the second switch 234 are selected. Further, the capacitances of the modulation capacitors when both of the plurality of first switches 231 and 232 and both of the plurality of second switches 233 and 234 are selected may be larger than the capacitances of the modulation capacitors when the first switch 231 and the second switch 233 are selected.

According to various embodiments of the disclosure, when the capacitances of the modulation capacitors are larger, the variation width of the voltage $V_{LC\_TX}$ across the transmission coil 213 may be large. In other words, the amplitude of the in-band communication signal may be large.

Figure 3:
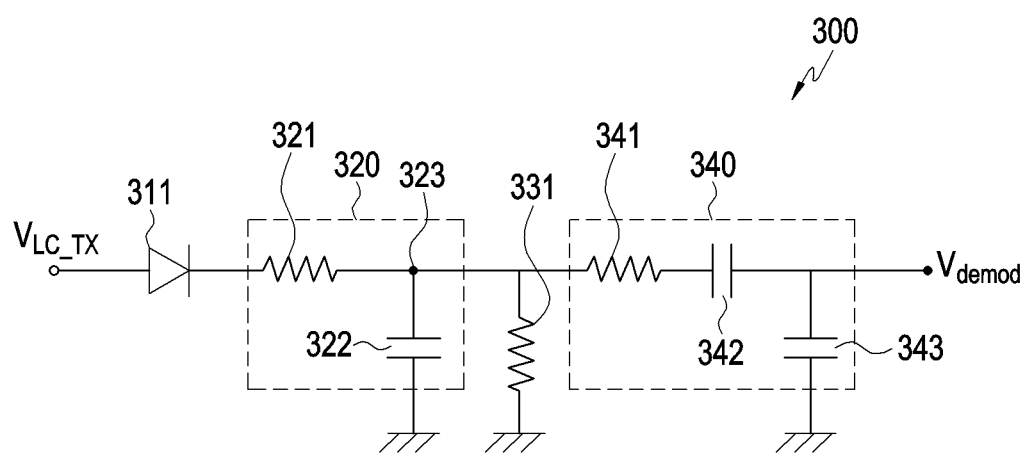
FIG. 3 is a view illustrating a demodulation circuit of a wireless power transmission device according to an embodiment of the disclosure.

FIG. 3 is a view illustrating a demodulation circuit of a wireless power transmission device according to an embodiment of the disclosure.

Referring to FIG. 3, a demodulation circuit 300 may include a diode 311, a first low pass filter 320, a resistor 331, and a second low pass filter 340. According to various embodiments of the disclosure, the first low pass filter 320 may include a resistor 321 and a capacitor 322. According to various embodiments of the disclosure, the second low pass filter 340 may include a resistor 341, a capacitor 342, and a capacitor 343.

According to various embodiments of the disclosure, the voltage VLC_TX across the transmission coil 213 may be input to the demodulation circuit 300 as an input signal. The output signal of the demodulation circuit 300 may be an output signal $V_{demod}$ of the second low pass filter 340.

The configuration of the demodulation circuit 300 of FIG. 3 is exemplary, and according to various embodiments of the disclosure, the configuration of the demodulation circuit 214 is not limited to the demodulation circuit 300 illustrated in FIG. 3.

Figure 4:
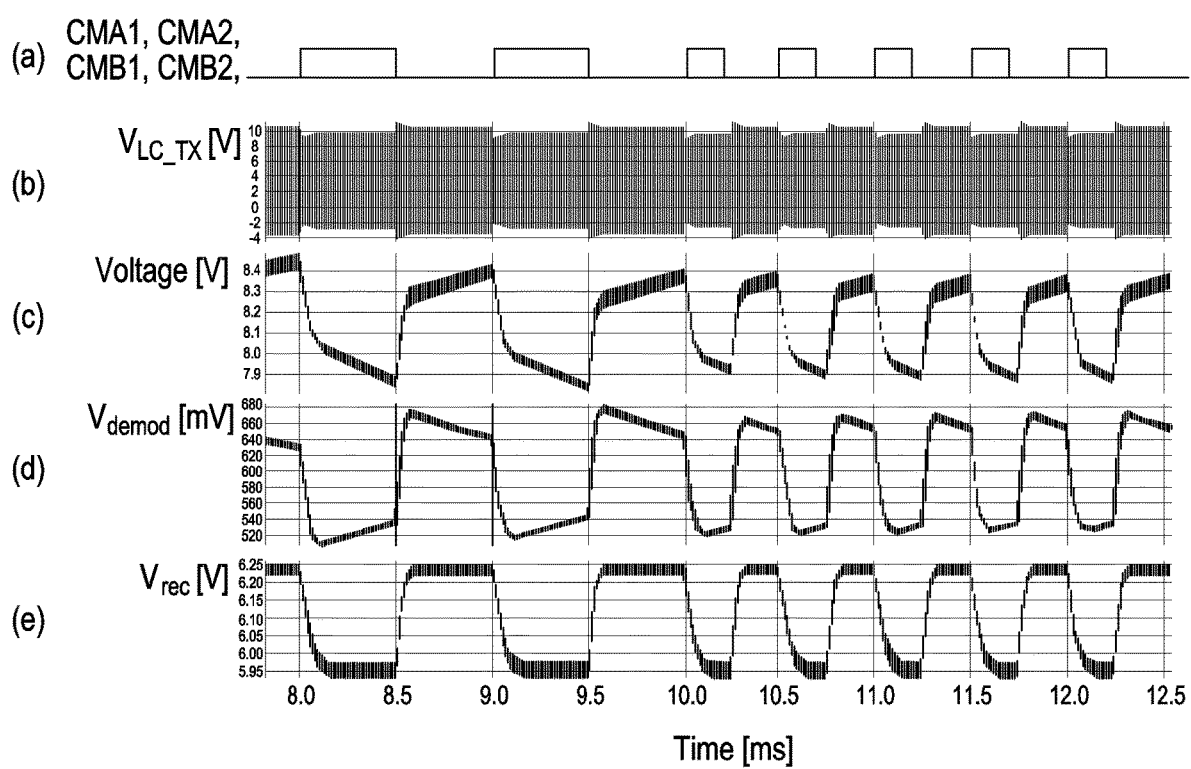
FIG. 4 illustrates demodulation signals and signals transferred to a wireless power reception device through in-band communication according to control of switches corresponding to a modulation capacitor in a wireless power reception device according to an embodiment of the disclosure.

FIG. 4 illustrates demodulation signals and signals transferred to a wireless power reception device through in-band communication according to control of switches corresponding to modulation capacitors in a wireless power reception device according to an embodiment of the disclosure.

FIG. 4 may relate to a scenario in which the wireless power reception device 102 transmits an in-band communication signal based on the voltage $V_{rec}$ of the output end of the rectification circuit 225.

Referring to part (a) of FIG. 4, it illustrates a control signal for controlling the plurality of first switches 231 and 232 and the plurality of second switches 233 and 234 output from the control circuit 250 when both of the plurality of first switches 231 and 232 and both of the plurality of second switches 233 and 234 are selected in the wireless power reception device 102 of FIG. 2.

Referring to part (b) of FIG. 4, it illustrates a voltage $V_{LC\_TX}$ between both ends of the transmission coil 213.

Referring to part (c) of FIG. 4, it illustrates an output signal at the output end 323 of the first low pass filter 320 of FIG. 3.

Referring to part (d) of FIG. 4, it illustrates an output signal $V_{demod}$ of the demodulation circuit 300.

Referring to part (e) of FIG. 4, it illustrates a voltage Vrec at the output end of the rectification circuit 225 of the wireless power reception device 102.

Referring to parts (a) and (b) of FIG. 4, it is identified that the voltage $V_{LC\_TX}$ across the transmission coil 213 changes as the plurality of first switches 231 and 232 and the plurality of second switches 233 and 234 are repeatedly turned on/off. Referring to parts (d) and (e) of FIG. 4, since the waveform of the output signal $V_{demod}$ which is the output of the voltage $V_{LC\_TX}$ across the transmission coil 213 via the demodulation circuit 300 is similar to the waveform of the voltage $V_{rec}$ at the output end of the rectification circuit 225, the wireless power reception device 102 may adjust the transmission power based on the output signal $V_{demod}$.

Figure 5:
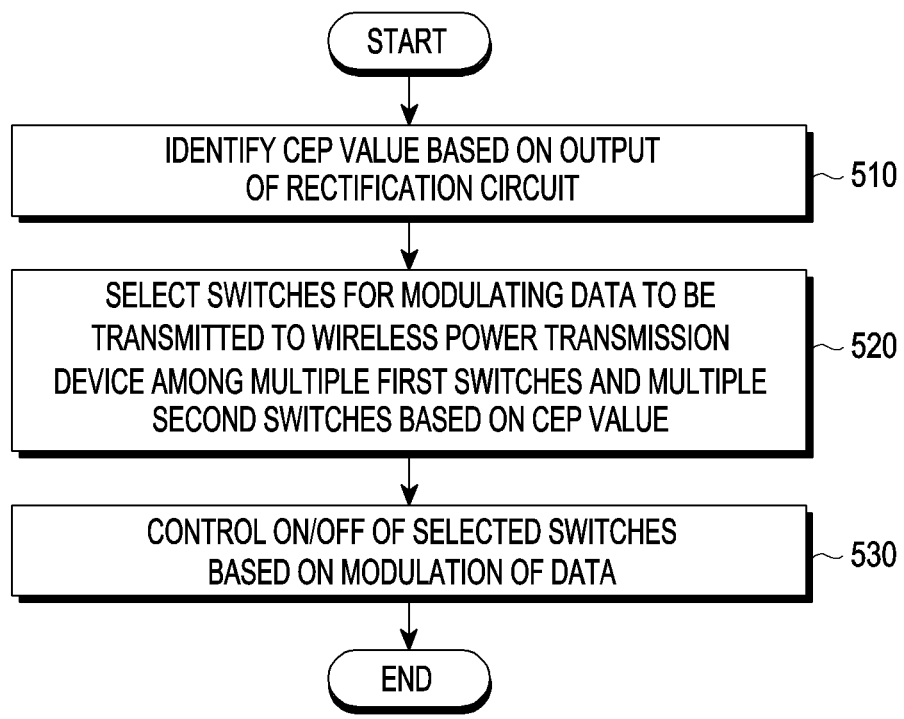
FIG. 5 is a flowchart illustrating operations performed in a wireless power reception device according to an embodiment of the disclosure.

FIG. 5 is a flowchart illustrating operations performed in a wireless power reception device according to an embodiment of the disclosure.

Referring to FIG. 5, according to various embodiments of the disclosure, the control circuit 250 of the wireless power reception device (e.g., the wireless power reception device 102) may identify the CEP value based on the output $V_{rec}$ of the rectification circuit 225 of the wireless power reception device 102 in operation 510.

According to various embodiments of the disclosure, the CEP value CEP value may be identified as shown in Equation 1.

$$\text{CEP\_value} = \frac{V_{rec,target} - V_{rec}}{ScaledV_{rec,target}} \times 128 \qquad \text{Equation 1}$$

In Equation 1, $V_{rec}$, target may be the target voltage. Scaled $V_{rec}$, target may be a predetermined constant. For example, Scaled $V_{rec,target}$ may be a constant at which the absolute value of CEP value is 1 when the difference between the output $V_{rec}$ of the rectification circuit 225 and the target voltage. According to various embodiments of the disclosure, the CEP value may have a value from −127 to 127.

According to various embodiments of the disclosure, in operation 520, the control circuit 250 of the wireless power reception device (e.g., the wireless power reception device 102) may select switches for modulating data to be transmitted to the wireless power transmission device from among the plurality of first switches 231 and 232 and the plurality of second switches 233 and 234, based on the CEP value.

According to various embodiments of the disclosure, the control circuit 250 may select the first switch 232 connected to the first capacitor 262 having a smaller capacitance among the plurality of first capacitors 261 and 262 and the second switch 234 connected to the second capacitor 264 having a smaller capacitance among the plurality of second capacitors 263 and 264, select the first switch 231 connected to the first capacitor 261 having a larger capacitance among the plurality of first capacitors 261 and 262 and the second switch 233 connected to the second capacitor 263 having a larger capacitance among the plurality of second capacitors 263 and 264, or select both the first switches 231 and 232 and both the second switches 233 and 234.

According to various embodiments of the disclosure, when the CEP value indicates that in-band communication is smooth, the control circuit 250 may select switches such that the capacitances of the modulation capacitors are small. According to various embodiments of the disclosure, when the CEP value indicates that in-band communication is not smooth, the control circuit 250 may select switches such that the capacitances of the modulation capacitors are large. For example, the rapid decrease in the CEP value may be a result of adjusting the transmission power based on the in-band signal by the wireless power reception device 102 due to smooth in-band communication. Accordingly, when the CEP value decreases rapidly, the control circuit 250 may select switches such that the capacitances of the modulation capacitors are small. Conversely, when the rate at which the CEP value decreases is slow or the CEP value does not decrease, the control circuit 250 may select the switches such that the capacitances of the modulation capacitors are small.

Assuming that the capacitance CB1 of the first capacitor 262 is larger than the capacitance CA1 of the first capacitor 261 and the capacitance CB2 of the second capacitor 264 is larger than the capacitance CA2 of the second capacitor 263, the capacitances of the modulation capacitors may be larger when the first switch 231 and the second switch 233 are selected than when the first switch 232 and the second switch 234 are selected, and may be larger when both the first switches 231 and 233 and both the second switches 233 and 234 are selected than when the first switch 231 and the second switch 233 are selected. When both the first switches 231 and 232 and both the second switches 233 and 234 are selected, the wireless power reception device 102 may be equivalent to having a single capacitor having a capacitance of the sum of the capacitance $C_{A1}$ of the first capacitor 261 and the capacitance $C_{B1}$ of the first capacitor 262 and a single capacitor having a capacitance of the sum of the capacitance $C_{A2}$ of the second capacitor 263 and the capacitance $C_{B2}$ of the second capacitor 264 as modulation capacitors.

An example of a reference for selecting switches in the control circuit 250 is described with reference to FIGS. 6A and 6B. However, the criteria described with reference to FIGS. 6A and 6B are exemplary, and the method for selecting the switches according to various embodiments is not limited as long as the switches are selected such that the capacitances of the modulation capacitors are small when in-band communication is smooth, and the capacitances of the modulation capacitors are large when in-band communication is not smooth.

According to an embodiment of the disclosure, the control circuit 250 of the wireless power reception device (e.g., the wireless power reception device 102) may control the on/off of the selected switches based on the modulation of the data in operation 530. According to various embodiments of the disclosure, the modulated data may be data to be transmitted to the wireless power transmission device 101. For example, the modulated data may indicate the voltage $V_{rec}$ of the output end of the rectification circuit 225. In another example, the modulated data may be a CEP value identified based on the voltage $V_{rec}$ of the output end of the rectification circuit 225.

Figure 6A:
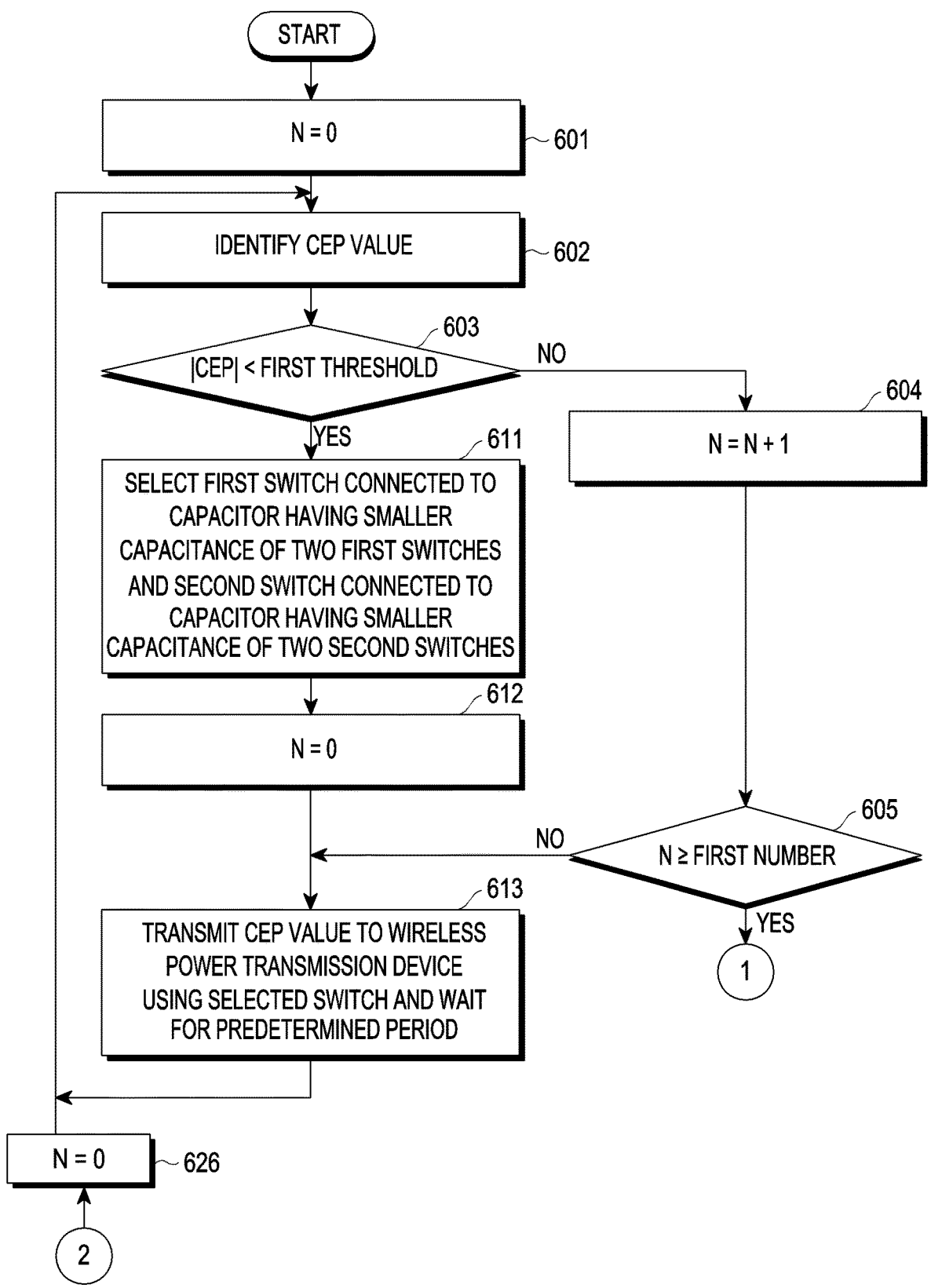
FIGS. 6A and 6B are flowcharts illustrating operations performed in a wireless power reception device according to various embodiments of the disclosure.
Figure 6B:
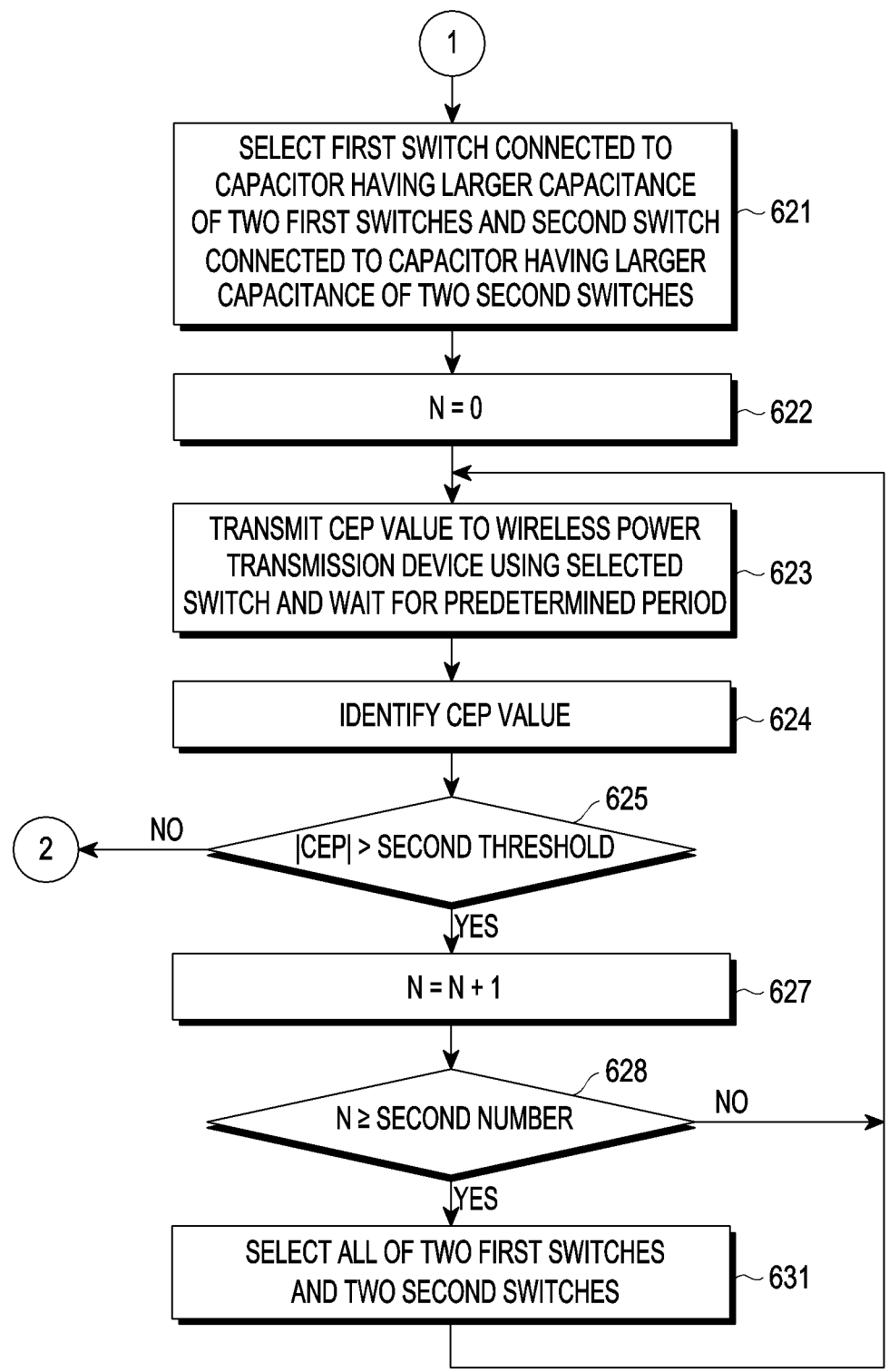

FIGS. 6A and 6B are flowcharts illustrating operations performed in a wireless power reception device according to various embodiments of the disclosure.

Referring to FIGS. 6A and 6B, they illustrate operations that may be performed in a wireless power reception device including two first capacitors 261 and 262, two first switches 231 and 232, two second capacitors 263 and 264, and two second switches 233 and 234, like the wireless power reception device 102 illustrated in FIG. 2.

According to various embodiments of the disclosure, the wireless power reception device (e.g., the control circuit 250 of the wireless power reception device 102) may set the value of variable N for counting to 0 in operation 601.

In operation 602, the wireless power reception device (e.g., the control circuit 250 of the wireless power reception device 102) may identify the CEP value based on the output voltage $V_{rec}$ of the rectification circuit 225. The relationship between the output voltage $V_{rec}$ of the rectification circuit 225 and the CEP value has been described above with reference to Equation 1.

In operation 603, the wireless power reception device (e.g., the control circuit 250 of the wireless power reception device 102) may identify whether the absolute value of the CEP value is less than a predetermined first threshold.

When it is identified that the absolute value of the CEP value is less than the predetermined first threshold in operation 603, the wireless power reception device (e.g., the control circuit 250 of the wireless power reception device 102) may select, in operation 611, the first switch 232 connected to the first capacitor 262 having a smaller capacitance of the two first switches 231 and 232 and the second switch 234 connected to the second capacitor 264 having a smaller capacitance of the two second switches 233 and 234. According to various embodiments of the disclosure, when the first switch 232 and the second switch 234 are selected, it may be represented that the wireless power reception device 102 is at a first level.

In operation 612, the wireless power reception device (e.g., the control circuit 250 of the wireless power reception device 102) may set the value of variable N for counting to 0.

In operation 613, the wireless power reception device (e.g., the control circuit 250 of the wireless power reception device 102) may transmit the CEP value to the wireless power transmission device using the selected switch and may wait for a predetermined period. According to various embodiments of the disclosure, the wireless power reception device (e.g., the control circuit 250 of the wireless power reception device 102) may control the first switch 231 and the second switch 233 to be turned off, and may control the on/off of the first switch 232 and the second switch 234 to transmit an in-band communication signal indicating the CEP value.

After performing operation 613, the wireless power reception device (e.g., the control circuit 250 of the wireless power reception device 102) may return to operation 602.

When it is identified that the absolute value of the CEP value is larger than or equal to the predetermined first threshold in operation 603, the wireless power reception device (e.g., the control circuit 250 of the wireless power reception device 102) may increase the value of variable N for counting by 1 in operation 604. In operation 605, the wireless power reception device (e.g., the control circuit 250 of the wireless power reception device 102) may identify whether the value of the variable N is larger than or equal to a predetermined first number of times.

When it is identified that the value of variable N is larger than or equal to the predetermined first number of times in operation 605, the wireless power reception device (e.g., the control circuit 250 of the wireless power reception device 102) may select, in operation 621, the first switch 231 connected to the first capacitor 261 having a larger capacitance of the two first switches 231 and 232 and the second switch 233 connected to the second capacitor 263 having a larger capacitance of the two second switches 233 and 234. According to various embodiments of the disclosure, when the first switch 231 and the second switch 233 are selected, it may be represented that the wireless power reception device 102 is at a second level.

When it is identified that the value of variable N is less than the predetermined first number of times in operation 605, the wireless power reception device (e.g., the control circuit 250 of the wireless power reception device 102) may perform operation 613. In other words, in order for the wireless power reception device (e.g., the control circuit 250 of the wireless power reception device 102) to transition from the first level to the second level, the number of times in which the absolute value of the CEP value is identified as the predetermined first threshold or more should be a predetermined first number of times. When the in-band communication is smoothly performed, the wireless power transmission device 101 may control the transmitted wireless power such that the absolute value of the CEP value is close to zero. Accordingly, when the number of times in which the absolute value of the CEP value is identified as larger than or equal to the predetermined first threshold becomes the predetermined first number of times, it may indicate that in-band communication is not smoothly performed, and the wireless power reception device 102 may transition from the first level to the second level.

In operation 622, the wireless power reception device (e.g., the control circuit 250 of the wireless power reception device 102) may set the value of variable N to 0.

In operation 623, the wireless power reception device (e.g., the control circuit 250 of the wireless power reception device 102) may transmit the CEP value to the wireless power transmission device using the selected switch and may wait for a predetermined period. According to various embodiments of the disclosure, when the wireless power reception device (e.g., the control circuit 250 of the wireless power reception device 102) is at the second level, the wireless power reception device (e.g., the control circuit 250 of the wireless power reception device 102) may control the first switch 232 and the second switch 234 to be turned off, and may control the on/off of the first switch 231 and the second switch 233 to transmit an in-band communication signal indicating the CEP value in operation 623.

According to various embodiments of the disclosure, when the wireless power reception device (e.g., the control circuit 250 of the wireless power reception device 102) is at the third level, the wireless power reception device (e.g., the control circuit 250 of the wireless power reception device 102) may control on/off of the first switch 231, the first switch 232, the second switch 233, and the second switch 234 to transmit the in-band communication signal indicating the CEP value in operation 623.

In operation 624, the wireless power reception device (e.g., the control circuit 250 of the wireless power reception device 102) may identify the CEP value based on the output voltage $V_{rec}$ of the rectification circuit 225.

In operation 625, the wireless power reception device (e.g., the control circuit 250 of the wireless power reception device 102) may identify whether the absolute value of the CEP value identified in operation 624 exceeds the second threshold.

When it is identified that the absolute value of the CEP value is less than or equal to the second threshold in operation 625, the wireless power reception device (e.g., the control circuit 250 of the wireless power reception device 102) may set the value of variable N to 0 in operation 626, and may return to operation 602.

According to various embodiments of the disclosure, the second threshold may be set to a value smaller than the first threshold. In this case, if the absolute value of the CEP value is less than or equal to the second threshold, the absolute value of the CEP value is less than the first threshold, so that the wireless power reception device (e.g., the control circuit 250 of the wireless power reception device 102) may perform operation 626 and then perform operation 611. In other words, if the absolute value of the CEP value decreases and becomes less than or equal to the second threshold when the wireless power reception device 102 is at the second level, the wireless power reception device 102 may transition to the first level. When the in-band communication is smoothly performed, the wireless power transmission device 101 may control the transmitted wireless power such that the absolute value of the CEP value is close to zero. Accordingly, when the absolute value of the CEP value decreases and becomes less than or equal to the second threshold, it may indicate that in-band communication is smoothly performed, and the wireless power reception device 102 may transition from the second level to the first level.

When it is identified that the absolute value of the CEP value exceeds the second threshold in operation 625, the wireless power reception device (e.g., the control circuit 250 of the wireless power reception device 102) may increase the value of variable N by 1 in operation 627.

In operation 628, the wireless power reception device (e.g., the control circuit 250 of the wireless power reception device 102) may identify whether the value of the variable N is larger than or equal to a predetermined second number of times.

When it is identified that the value of variable N is equal to or larger than the predetermined second number of times in operation 628, the wireless power reception device (e.g., the control circuit 250 of the wireless power reception device 102) may select both the first switches 231 and 232 and both the second switches 233 and 234 in operation 631. According to various embodiments of the disclosure, when all of the two first switches 231 and 232 and the two second switches 233 and 234 are selected, it may be represented that the wireless power reception device 102 is at the third level.

When it is identified that the value of variable N is less than the predetermined second number of times in operation 628, the wireless power reception device (e.g., the control circuit 250 of the wireless power reception device 102) may return to operation 623. In other words, in order for the wireless power reception device (e.g., the control circuit 250 of the wireless power reception device 102) to transition from the second level to the third level, the number of times in which the absolute value of the CEP value is identified as exceeding the predetermined second threshold should be a predetermined second number of times.

When the in-band communication is smoothly performed, the wireless power transmission device 101 may control the transmitted wireless power such that the absolute value of the CEP value is close to zero. Accordingly, when the number of times in which the absolute value of the CEP value is identified as exceeding the predetermined second threshold becomes the predetermined second number of times, it may indicate that in-band communication is not smoothly performed, and the wireless power reception device 102 may transition from the second level to the third level.

The wireless power reception device (e.g., the control circuit 250 of the wireless power reception device 102) having performed operation 631 may return to operation 623. If the absolute value of the CEP value decreases and becomes less than or equal to the second threshold when the wireless power reception device 102 is at the third level, the wireless power reception device 102 may transition to the first level. When the in-band communication is smoothly performed, the wireless power transmission device 101 may control the transmitted wireless power such that the absolute value of the CEP value is close to zero. Accordingly, when the absolute value of the CEP value decreases and becomes less than or equal to the second threshold, it may indicate that in-band communication is smoothly performed, and the wireless power reception device 102 may transition from the third level to the first level.

Figure 7:
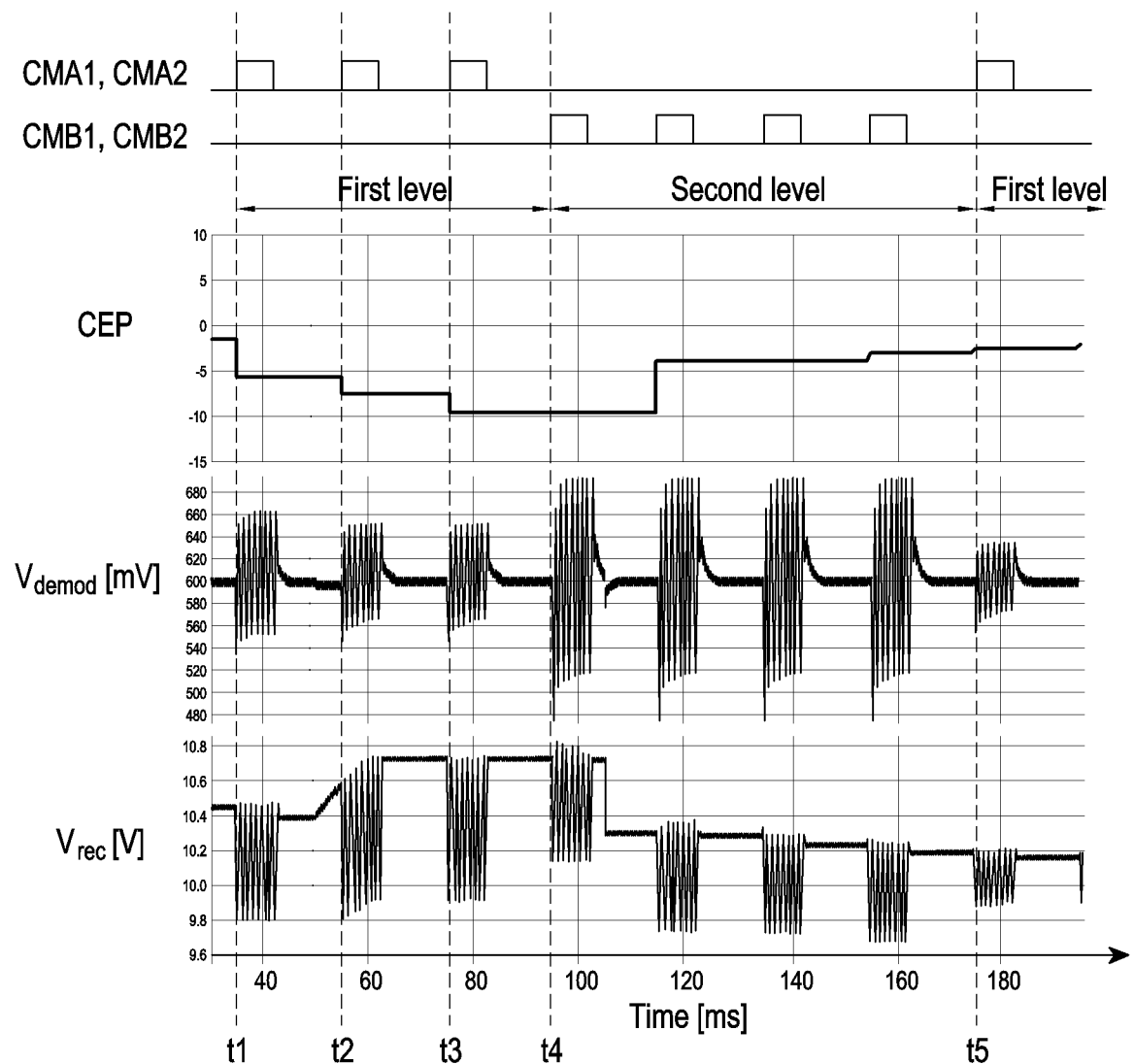
FIG. 7 illustrates a scenario of controlling a combination of capacitors for performing in-band communication in a wireless power reception device according to an embodiment of the disclosure.

FIG. 7 illustrates a scenario of controlling a combination of capacitors for performing in-band communication in a wireless power reception device according to an embodiment of the disclosure.

For example, FIG. 7 illustrates a scenario in which wireless power is controlled by performing the operations illustrated in FIGS. 6A and 6B in the wireless power reception device (e.g., the control circuit 250 of the wireless power reception device 102), and the first threshold is 9, the second threshold is 3, the first number is 2, the second number is 4, and the target voltage is 10V.

Referring to FIG. 7, a control signal CMA1 applied from the control circuit 250 to the first switch 232 and a control signal CMA2 applied from the control circuit 250 to the second switch 234 are illustrated. Further, a control signal CMB1 applied from the control circuit 250 to the first switch 231 and a control signal CMB2 applied from the control circuit 250 to the second switch 233 are illustrated. The signal indicated by CEP in FIG. 7 is a CEP value based on the voltage $V_{rec}$ of the output end of the rectification circuit 225 of the wireless power reception device 102, which is transferred from the wireless power reception device 102 to the wireless power transmitting device 101 in the form of an in-band communication signal. In FIG. 7, $V_{demod}$ denotes the output signal of the demodulation circuit 214.

From t1, the wireless power reception device (e.g., the control circuit 250 of the wireless power reception device 102) may perform operations 601 and 602, identify that the CEP value is −5 and the absolute value is less than 9, which is the first threshold, in operation 603, and perform operations 611 to 613. According to operation 613, the time immediately after a predetermined time elapses after transmitting the CEP value to the wireless power transmission device 101 may be t2. While the CEP value is transmitted to the wireless power transmission device 101 according to operation 613, the first switch 231 and the second switch 233 may be controlled to be in the off state by the control signal CMB1 and the control signal CMB2, and the first switch 232 and the second switch 234 may be controlled to repeat the on/off state by the control signal CMA1 and the control signal CMA2. In other words, the wireless power reception device 102 may be at the first level.

From t2, the wireless power reception device (e.g., the control circuit 250 of the wireless power reception device 102) may perform operation 602, identify that the CEP value is −7 and the absolute value is less than 9, which is the first threshold, in operation 603, and perform operations 611 to 613. According to operation 613, the time immediately after a predetermined time elapses after transmitting the CEP value to the wireless power transmission device 101 may be t3. From t2 to t3, the wireless power reception device 102 may be at the first level.

From t3, the wireless power reception device (e.g., the control circuit 250 of the wireless power reception device 102) may perform operation 602, identify that the CEP value is −10 and the absolute value is not less than 9, which is the first threshold, in operation 603, and increase N from 0 to 1 in operation 604. In operation 605, it may be identified that 1 which is the value of N is less than 2 which is the first number of times, and operation 613 may be performed. Since the switch selected in operation 611 between t2 and t3 is not changed, the wireless power reception device 102 may be at the first level when performing operation 613. According to operation 613, the time immediately after a predetermined time elapses after transmitting the CEP value to the wireless power transmission device 101 may be t4.

From t4, the wireless power reception device (e.g., the control circuit 250 of the wireless power reception device 102) may perform operation 602, identify that the CEP value is −10 and the absolute value is not less than 9, which is the first threshold, in operation 603, and increase N from 1 to 2 in operation 604. In operation 605, it may be identified that 2 which is the value of N is equal to 2 which is the first number of times, and operation 621 may be performed. While the CEP value is transmitted to the wireless power transmission device 101 according to operation 621, the first switch 232 and the second switch 234 may be controlled to be in the off state by the control signal CMA1 and the control signal CMA2, and the first switch 231 and the second switch 233 may be controlled to repeat the on/off state by the control signal CMB1 and the control signal CMB2. In other words, the wireless power reception device 102 may be at the second level.

The wireless power reception device 102 may perform operations 622 and 623. When operation 623 is performed, the CEP value transmitted to the wireless power transmission device 101 may be −10. As the wireless power reception device 102 is at the second level, the amplitude of the in-band communication signal transmitted from the wireless power reception device 102 to the wireless power transmission device 101 in operation 623 may be sufficiently large.

As a result, the voltage $V_{rec}$ at the output end of the rectification circuit 225 may be close to the target voltage of 10V, and the CEP value identified when the wireless power reception device 102 performs operation 624 may be −4. In operation 625, it may be identified that 4 which is the absolute value of the CEP value is larger than 3 which is the second threshold, and the wireless power reception device 102 may change the value of N from 0 to 1 in operation 627, identify that 1 which is the value of N is less than 3 which is the second number of times in operation 628, and may perform operation 623. The CEP value transmitted when the wireless power reception device 102 performs operation 623 may be −4.

Thereafter, at t5, the voltage $V_{rec}$ at the output end of the rectification circuit 225 may be close to the target voltage of 10V, and the CEP value identified when the wireless power reception device 102 performs operation 624 may be −3. In operation 625, the wireless power reception device 102 may identify that 3, which is the absolute value of the CEP value, is equal to or less than 3, which is the second threshold, and in operation 626, the wireless power reception device 102 may set the value of N to 0. Thereafter, since the CEP value identified in operation 602 is still −3 and the absolute value, 3, of the CEP value is less than the first threshold, 9, the wireless power reception device 102 may perform operation 611. In other words, the wireless power reception device 102 may transition from the second level to the first level at t5.

Figure 8:
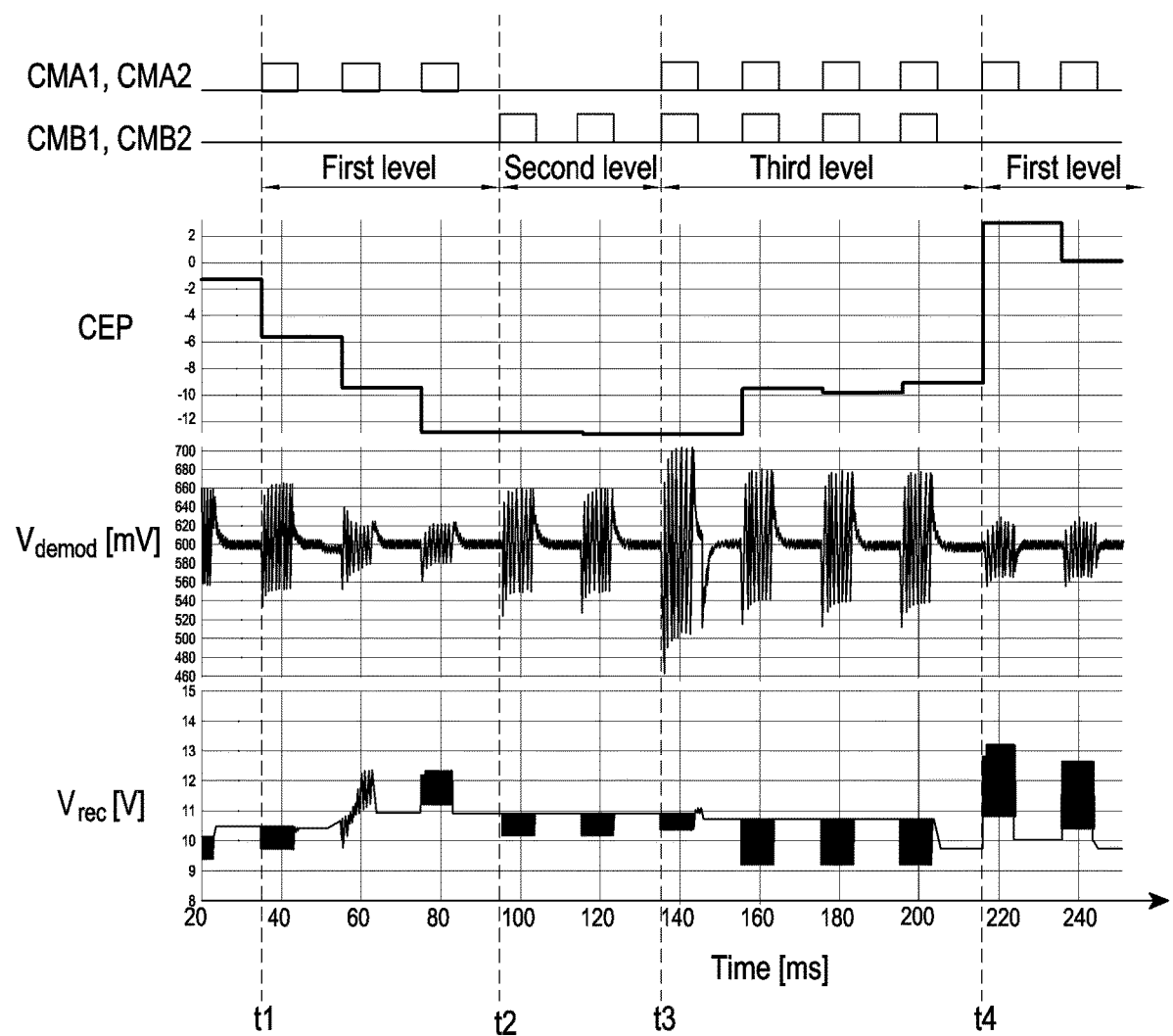
FIG. 8 illustrates a scenario of controlling a combination of capacitors for performing in-band communication in a wireless power reception device according to an embodiment of the disclosure.

FIG. 8 illustrates a scenario of controlling a combination of capacitors for performing in-band communication in a wireless power reception device according to an embodiment of the disclosure.

For example, FIG. 7 illustrates a scenario in which wireless power is controlled by performing the operations illustrated in FIGS. 6A and 6B in the wireless power reception device (e.g., the control circuit 250 of the wireless power reception device 102), and the first threshold is 9, the second threshold is 3, the first number is 3, the second number is 2, and the target voltage is 10V.

Referring to FIG. 8, details of the signals are the same as those described above with reference to FIG. 7.

From t1, the wireless power reception device (e.g., the control circuit 250 of the wireless power reception device 102) may perform operations 601 and 602, identify that the CEP value is −6 and the absolute value is less than 9, which is the first threshold, in operation 603, and perform operations 611 to 613. The CEP value transmitted in operation 613 may be −6. While transmitting the CEP value to the wireless power transmission device 101 according to operation 613, the wireless power reception device 102 may be at the first level.

Although the CEP value is repeatedly transmitted to the wireless power transmission device 101 in the form of an in-band communication signal at the first level, the difference between the voltage $V_{rec}$ at the output end of the rectification circuit 225 and the target voltage may increase. At t2, it may be third identified that the absolute value of the CEP exceeds the first threshold of 9, and accordingly, the wireless power reception device 102 may transition from the first level to the second level at t2.

Although the CEP value is repeatedly transmitted to the wireless power transmission device 101 in the form of an in-band communication signal at the second level, the difference between the voltage $V_{rec}$ at the output end of the rectification circuit 225 and the target voltage may not be reduced. At t3, when the wireless power reception device 102 performs operations 624, 625, 627, and 628, N may be equal to 2 which is the second number of times. Accordingly, the wireless power reception device 102 may transition from the second level to the third level according to operation 631 at t3. When the wireless power reception device 102 is at the third level, the first switch 231, the first switch 232, the second switch 233, and the second switch 234 may be controlled to repeat the on/off state.

The wireless power reception device 102 at the third level may repeat operation 623, operation 624, operation 625, operation 627, operation 628, and operation 631 until the absolute value of the CEP value decreases below the second threshold. When the voltage Vrec at the output end of the rectification circuit 225 of the wireless power reception device 102 is sufficiently close to the target voltage, the absolute value of the CEP value may be reduced to be less than or equal to the second threshold, and the wireless power reception device 102 may transition from the third level to the first level at t4.

Figure 9:
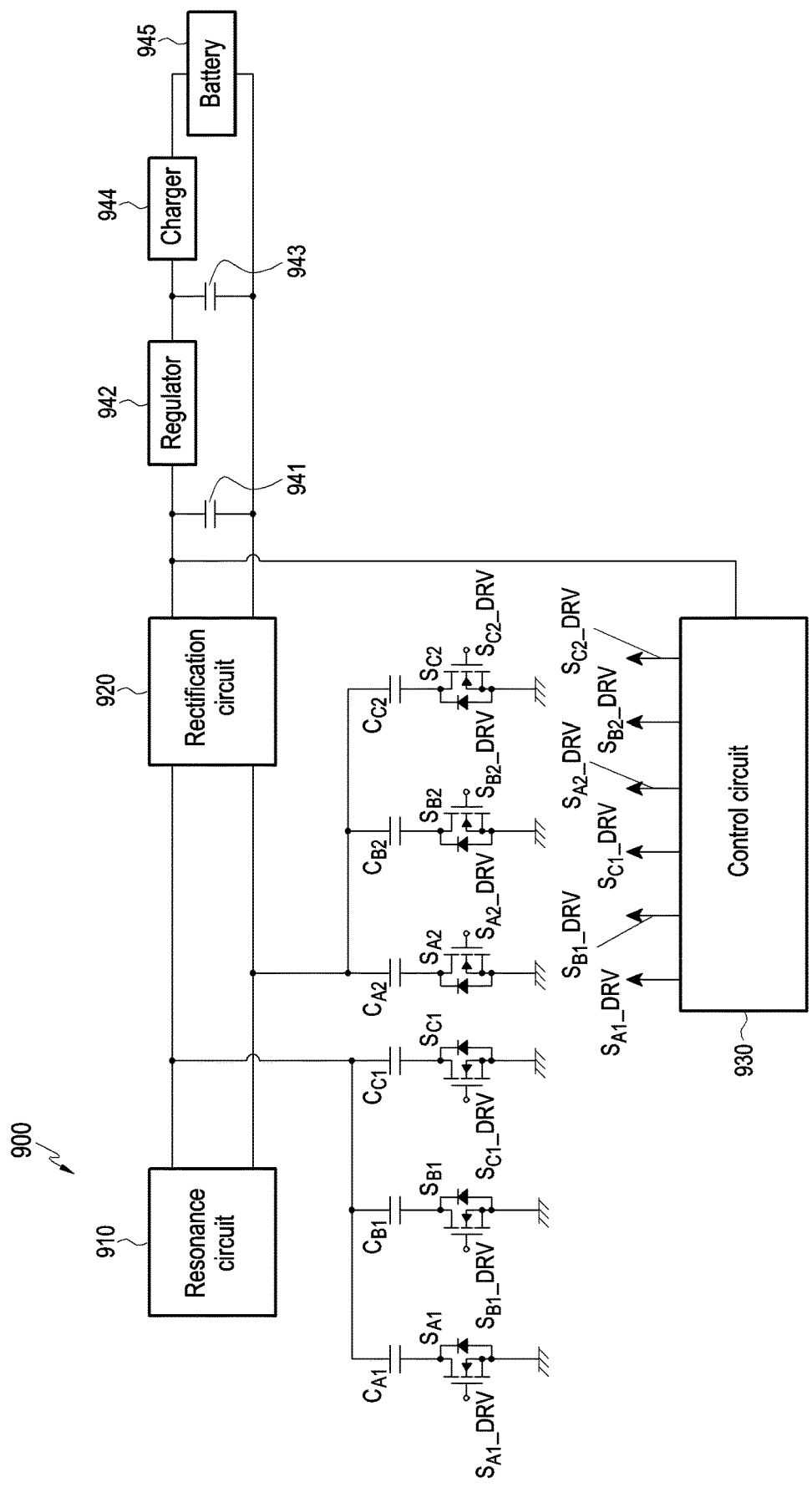
FIG. 9 is a view illustrating a configuration of a wireless power reception device according to an embodiment of the disclosure.

FIG. 9 is a view illustrating a configuration of a wireless power reception device according to an embodiment of the disclosure.

Referring to FIG. 9, a wireless power reception device 900 may include a resonance circuit 910, a rectification circuit 920, a plurality of first capacitors $C_{A1}$, $C_{B1}$, and $C_{C1}$, a plurality of first switches $S_{A1}$, $S_{B1}$, and $S_{C1}$ respectively connecting the plurality of first capacitors and a ground, a plurality of second capacitors $C_{A2}$, $C_{B2}$, and $C_{C2}$ a plurality of second switches $S_{A2}$, $S_{B2}$, and $S_{C2}$ respectively connecting the plurality of second capacitors and the ground, a control circuit 930, a capacitor 941, a regulator 942, a capacitor 943, a charger 944, and a battery 945.

As compared to the wireless power reception device 102 illustrated in FIG. 2, the wireless power reception device 102 includes two first capacitors 261 and 262, two first switches 231 and 232, two second capacitors 263 and 264, and two second switches 233 and 234, whereas the wireless power reception device 900 includes three first capacitors $C_{A1}$, $C_{B1}$, and $C_{C1}$, three first switches $S_{A1}$, $S_{B1}$, and $S_{C1}$, three second capacitors $C_{A2}$, $C_{B2}$, and $C_{C2}$, and three second switches $S_{A2}$, $S_{B2}$, and $S_{C2}$. The details of the resonance circuit 220, the rectification circuit 225, the control circuit 250, the capacitor 641, the regulator 242, the capacitor 643, the charger 244, and the battery 245 described above with reference to FIG. 2 may be equally applied to the resonance circuit 910, the rectification circuit 920, the control circuit 930, the capacitor 941, the regulator 942, the capacitor 943, the charger 944, and the battery 945, respectively.

According to various embodiments of the disclosure, the control circuit 930 may select switches for modulating data to be transmitted to the wireless power transmission device (not shown) from among the plurality of first switches $S_{A1}$, $S_{B1}$, $S_{C1}$ and the plurality of second switches $S_{A2}$, $S_{B2}$, and $S_{C2}$ based on the voltage $V_{rec}$ at the output end of the rectification circuit 920. According to various embodiments of the disclosure, the control circuit 930 may select the switches based on the CEP value identified based on the voltage $V_{rec}$ at the output end of the rectification circuit 920.

According to various embodiments of the disclosure, as the control circuit 930 selects different combinations of switches, a combination of capacitors that may be used as a modulation capacitor among the plurality of first capacitors $C_{A1}$, $C_{B1}$, and $C_{C1}$ and the plurality of second capacitors $C_{A2}$, $C_{B2}$, and $C_{C2}$ may vary. While the wireless power reception device 102 illustrated in FIG. 2 may be at the first level, the second level, and the third level, the wireless power reception device 900 illustrated in FIG. 9 may be at up to seven levels. Assuming that the capacitance of the first capacitor C B1 is larger than the capacitance of the first capacitor $C_{A1}$, the capacitance of the first capacitor $C_{C1}$ is larger than the capacitance of the first capacitor $C_{B1}$, the capacitance of the second capacitor $C_{B2}$ is larger than the capacitance of the second capacitor $C_{A2}$, and the capacitance of the second capacitor $C_{C2}$ is larger than the capacitance of the second capacitor $C_{B2}$, the levels that the wireless power reception device 900 may have are arranged in the order of the capacitances of the modulation capacitors as follows.

TABLE 1

| | modulation capacitance | | |
|---|---|---|---|
| | first capacitor $C_{A1}$ and second capacitor $C_{A2}$ | first capacitor $C_{B1}$ and second capacitor $C_{B2}$ | first capacitor $C_{C1}$ and second capacitor $C_{C2}$ |
| first level | ○ | X | X |
| second level | X | ○ | X |
| third level | X | X | ○ |
| fourth level | ○ | ○ | X |
| fifth level | ○ | X | ○ |
| sixth level | X | ○ | ○ |
| seventh level | ○ | ○ | ○ |

According to various embodiments of the disclosure, when in-band communication is smooth, the control circuit 930 may select switches such that the capacitances of the modulation capacitors are small. For example, in response to identifying that the CEP value identified based on the voltage $V_{rec}$ of the output end of the rectification circuit 920 is less than a first threshold, the control circuit 930 may select the first switch Sal connected to the first capacitor $C_{A1}$ having the smallest capacitance among the plurality of first switches $S_{A1}$, $S_{B1}$, and $S_{C1}$ and the second switch $S_{A2}$ connected to the second capacitor $C_{A2}$ having the smallest capacitance among the plurality of second switches $S_{A2}$, $S_{B2}$, and $S_{C2}$ as switches for modulating data. In other words, the wireless power reception device 900 may be at the first level. According to various embodiments of the disclosure, in response to identifying that the CEP value identified based on the voltage $V_{rec}$ of the output end of the rectification circuit 920 is less than the second threshold in a state in which the wireless power reception device 900 is at a level other than the first level, the control circuit 930 may select the first switch Sal connected to the first capacitor Cal having the smallest capacitance among the plurality of first switches SA1, $S_{B1}$, and $S_{C1}$, and the second switch $S_{A2}$ connected to the second capacitor $C_{A2}$ having the smallest capacitance among the plurality of second switches $S_{A2}$, $S_{B2}$, and $S_{C2}$ as switches for modulating data. In other words, the wireless power reception device 900 may transition to the first level.

According to various embodiments of the disclosure, when in-band communication is not smooth, the control circuit 930 may select switches such that the capacitances of the modulation capacitors are large.

FIG. 9 illustrates that the wireless power reception device 900 includes three first capacitors $C_{A1}$, $C_{B1}$, and $C_{C1}$, three first switches $S_{A1}$, $S_{B1}$, and $S_{C1}$, three second capacitors $C_{A2}$, $C_{B2}$, and $C_{C2}$, and three second switches $S_{A2}$, $S_{B2}$, and $S_{C2}$. However, according to various embodiments of the disclosure, the numbers of first capacitors, first switches, second capacitors, and second switches that the wireless power reception device 102 may include are not limited.

According to various embodiments of the disclosure, a wireless power reception device (e.g., the wireless power reception device 102) may comprise a resonance circuit (e.g., the resonance circuit 220) configured to receive wireless power from a wireless power transmission device (e.g., the wireless power transmission device 101), a plurality of first capacitors (e.g., the plurality of first capacitors 261 and 262), a plurality of first switches (e.g., the plurality of first switches 231 and 232), a plurality of second capacitors (e.g., the plurality of second capacitors 263 and 264), a plurality of second switches (e.g., the plurality of second switches 233 and 234), a rectification circuit (e.g., the rectification circuit 225) connected to a first end and a second end of the resonance circuit 220, and a control circuit (e.g., the control circuit 250) connected to the rectification circuit 225. Each of first ends of the plurality of first capacitors 261 and 262 may be connected to the first end of the resonance circuit 220, second ends of the plurality of first capacitors 261 and 262 may be respectively connected to first ends of the plurality of first switches 231 and 232, and second ends of the plurality of first switches 231 and 232 may be connected to a ground. Each of first ends of the plurality of second capacitors 263 and 264 may be connected to the second end of the resonance circuit 220, second ends of the plurality of second capacitors 263 and 264 may be respectively connected to first ends of the plurality of second switches 233 and 234, and second ends of the plurality of second switches 233 and 234 may be connected to the ground. The control circuit 250 may be configured to select switches for modulating data to be transmitted to the wireless power transmission device 101 among the plurality of first switches 231 and 232 and the plurality of second switches 233 and 234 based on a CEP value identified based on an output of the rectification circuit 225 and control on/off of the selected switches based on modulation of the data.

According to various embodiments of the disclosure, the control circuit 250 may be configured to wait for a predetermined period after controlling the on/off of the selected switches based on the modulation of the data and re-identify the CEP value after the predetermined period elapses.

According to various embodiments of the disclosure, the plurality of first capacitors 261 and 262 may include two first capacitors 261 and 262. The plurality of second capacitors 263 and 264 may include two second capacitors 263 and 264, and the plurality of first switches 231 and 232 may include two first switches 231 and 232. The plurality of second switches 233 and 234 may include two second switches 233 and 234. The control circuit 250 may be configured to, when selecting switches for modulating the data from among the plurality of first switches 231 and 232 and the plurality of second switches 233 and 234, select a first switch (e.g., the first switch 232) connected to a capacitor (e.g., the first capacitor 262) having a smaller capacitance among the two first capacitors, of the two first switches and a second switch (e.g., the second switch 234) connected to a capacitor (e.g., the second capacitor 264) having a smaller capacitance among the two second capacitors, of the two second switches, select a first switch (e.g., the first switch 231) connected to a capacitor (e.g., the first capacitor 261) having a larger capacitance among the two first capacitors, of the two first switches 231 and 232 and a second switch (e.g., the second switch 233) connected to a capacitor (e.g., the second capacitor 263) having a larger capacitance among the two second capacitors, of the two second switches 233 and 234, or select all of the two first switches 231 and 232 and the two second switches 233 and 234.

According to various embodiments of the disclosure, the control circuit 250 may be configured to select the first switch 232 connected to the capacitor (e.g., the first capacitor 262) having the smaller capacitance of the two first switches 231 and 232 and the second switch 234 connected to the capacitor (e.g., the second capacitor 264) having the smaller capacitance of the two second switches 233 and 234, as the switches for modulating the data, in response to identifying that an absolute value of the CEP value is smaller than a first threshold.

According to various embodiments of the disclosure, the control circuit 250 may be configured to select the first switch 231 connected to the capacitor (e.g., the first capacitor 261) having the larger capacitance of the two first switches 231 and 232 and the second switch 233 connected to the capacitor (e.g., the second capacitor 263) having the larger capacitance of the two second switches 233 and 234, as the switches for modulating the data, in response to a number of times in which the absolute value of the CEP value is identified as the first threshold or more being a first number or more.

According to various embodiments of the disclosure, the control circuit 250 may be configured to, in response to identifying that the absolute value of the CEP value is a second threshold or less in a state in which the first switch 231 connected to the capacitor (e.g., the first capacitor 261) having the larger capacitance of the two first switches 231 and 232 and the second switch 233 connected to the capacitance (e.g., the second capacitor 263) having the larger capacitance of the two second switches 233 and 234 are selected as the switches for modulating the data, select the first switch 232 connected to the capacitor (e.g., the first capacitor 262) having the smaller capacitance of the two first switches 231 and 232 and the second switch 234 connected to the capacitor (e.g., the second capacitor 264) having the smaller capacitance of the two second switches 233 and 234, as the switches for modulating the data.

According to various embodiments of the disclosure, the control circuit 250 may be configured to, in response to identifying that a number of times in which the absolute value of the CEP value is identified as a second threshold or more is a second number or more in a state in which the first switch 231 connected to the capacitor (e.g., the first capacitor 261) having the larger capacitance of the two first switches 231 and 232 and the second switch 233 connected to the capacitor (e.g., the second capacitor 263) having the larger capacitance of the two second switches 233 and 234 are selected as the switches for modulating the data, select all of the two first switches 231 and 232 and the two second switches 233 and 234 as the switches for modulating the data.

According to various embodiments of the disclosure, the control circuit 250 may be configured to, in response to identifying that the absolute value of the CEP value is less than the second threshold in a state where both all of the two first switches 231 and 232 and the two second switches 233 and 234 are selected as the switches for modulating the data, select the first switch 232 connected to the capacitor (e.g., the first capacitor 262) having the smaller capacitance of the two first switches 231 and 232 and the second switch 234 connected to the capacitor (e.g., the second capacitor 264) having the smaller capacitance of the two second switches 233 and 234, as the switches for modulating the data.

According to various embodiments of the disclosure, the control circuit 250 may be configured to, in response to identifying that the CEP value is less than a first threshold, select a first switch connected to a capacitor having a smallest capacitance among the plurality of first capacitors, among the plurality of first switches 231 and 232 and a second switch connected to a capacitor having a smallest capacitance among the plurality of second capacitors, among the plurality of second switches 233 and 234, as the switches for modulating the data.

According to various embodiments of the disclosure, the control circuit 250 may be configured to, in response to identifying that the CEP value is less than a second threshold in a state in which the selected switches differ from a combination of a first switch connected to a first capacitor, which has a smallest capacitance among the plurality of first capacitors, among the plurality of first switches 231 and 232 and a second switch connected to a second capacitor, which has a smallest capacitance among the plurality of second capacitors, among the plurality of second switches 233 and 234, select the first switch connected to the first capacitor having the smallest capacitance among the plurality of first switches 231 and 232 and the second switch connected to the second capacitor having the smallest capacitance among the plurality of second switches 233 and 234, as the switches for modulating the data.

According to various embodiments of the disclosure, the modulated data may indicate the CEP value.

According to various embodiments of the disclosure, a method performed by a wireless power reception device (e.g., the wireless power reception device 102) including a resonance circuit (e.g., the resonance circuit 220), a plurality of first capacitors (e.g., the plurality of first capacitors 261 and 262), a plurality of first switches (e.g., the plurality of first switches 231 and 232), a plurality of second capacitors (e.g., the plurality of second capacitors 263 and 264), and a plurality of second switches (e.g., the plurality of second switches 233 and 234), wherein each of first ends of the plurality of first capacitors 261 and 262 may be connected to the first end of the resonance circuit 220, second ends of the plurality of first capacitors 261 and 262 are respectively connected to first ends of the plurality of first switches 231 and 232, and second ends of the plurality of first switches 231 and 232 are connected to a ground, wherein each of first ends of the plurality of second capacitors 263 and 264 may be connected to the second end of the resonance circuit 220, second ends of the plurality of second capacitors 263 and 264 may be respectively connected to first ends of the plurality of second switches 233 and 234, and second ends of the plurality of second switches 233 and 234 may be connected to the ground, may comprise identifying a CEP value based on an output of a rectification circuit 225 of the wireless power reception device 102, selecting switches for modulating data to be transmitted to a wireless power transmission device (e.g., the wireless power transmission device 101) among the plurality of first switches 231 and 232 and the plurality of second switches 233 and 234 based on the CEP value, and controlling on/off of the selected switches based on the modulation of the data.

According to various embodiments of the disclosure, the method may further comprise waiting for a predetermined period after controlling the on/off of the selected switches based on the modulation of the data, and re-identifying the CEP value after the predetermined period elapses.

According to various embodiments of the disclosure, the plurality of first capacitors 261 and 262 may include two first capacitors 261 and 262. The plurality of second capacitors 263 and 264 may include two second capacitors 263 and 264. The plurality of first switches 231 and 232 may include two first switches 231 and 232. The plurality of second switches 233 and 234 may include two second switches 233 and 234. Selecting the switches for modulating the data may include one of selecting a first switch 232 connected to a capacitor (e.g., the first capacitor 262) having a smaller capacitance among the two first capacitors, of the two first switches 231 and 232 and a second switch 234 connected to a capacitor (e.g., the second capacitor 264) having a smaller capacitance among the two second capacitors, of the two second switches 233 and 234, selecting a first switch 231 connected to a capacitor (e.g., the first capacitor 261) having a larger capacitance two first capacitors, of the two first switches 231 and 232 and a second switch 233 connected to a capacitor (e.g., the second capacitor 263) having a larger capacitance among the two second capacitors, of the two second switches 233 and 234, or selecting all of the two first switches 231 and 232 and the two second switches 233 and 234.

Selecting the switches for modulating the data may include selecting the first switch 232 connected to the capacitor (e.g., the first capacitor 262) having the smaller capacitance of the two first switches 231 and 232 and the second switch 234 connected to the capacitor (e.g., the second capacitor 264) having the smaller capacitance of the two second switches 233 and 234, as the switches for modulating the data, in response to identifying that an absolute value of the CEP value is smaller than a first threshold.

According to various embodiments of the disclosure, selecting the switches for modulating the data may include selecting the first switch 231 connected to the capacitor (e.g., the first capacitor 261) having the larger capacitance of the two first switches 231 and 232 and the second switch 233 connected to the capacitor (e.g., the second capacitor 263) having the larger capacitance of the two second switches 233 and 234, as the switches for modulating the data, in response to a number of times in which the absolute value of the CEP value is identified as the first threshold or more being a first number or more.

According to various embodiments of the disclosure, the method may further comprise, in response to identifying that the absolute value of the CEP value is a second threshold or less in a state in which the first switch 231 connected to the capacitor (e.g., the first capacitor 261) having the larger capacitance of the two first switches 231 and 232 and the second switch 233 connected to the capacitance (e.g., the second capacitor 263) having the larger capacitance of the two second switches 233 and 234 are selected as the switches for modulating the data, selecting the first switch 232 connected to the capacitor (e.g., the first capacitor 262) having the smaller capacitance of the two first switches 231 and 232 and the second switch 234 connected to the capacitor (e.g., the second capacitor 264) having the smaller capacitance of the two second switches 233 and 234, as the switches for modulating the data and, based on the modulation of the data indicating the CEP value, controlling on/off of a first switch 232 connected to a capacitor (e.g., the first capacitor 262) having a smaller capacitance of the two first switches 231 and 232 and a second switch 234 connected to a capacitor (e.g., the second capacitor 264) having a smaller capacitance of the two second switches 233 and 234.

According to various embodiments of the disclosure, the method may further comprise, in response to identifying that a number of times in which the absolute value of the CEP value is identified as a second threshold or more is a second number or more in a state in which the first switch 231 connected to the capacitor (e.g., the first capacitor 261) having the larger capacitance of the two first switches 231 and 232 and the second switch 233 connected to the capacitor (e.g., the second capacitor 263) having the larger capacitance of the two second switches 233 and 234 are selected as the switches for modulating the data, selecting all of the two first switches 231 and 232 and the two second switches 233 and 234 as the switches for modulating the data and, based on the modulation of the data indicating the CEP value, controlling on/off of all of the two first switches 231 and 232 and the two second switches 233 and 234.

According to various embodiments of the disclosure, the method may further comprise, in response to identifying that the absolute value of the CEP value is less than the second threshold in a state in which all of the two first switches 231 and 232 and the two second switches 233 and 234 are selected as the switches for modulating the data, selecting the first switch 232 connected to the capacitor (e.g., the first capacitor 262) having the smaller capacitance of the two first switches 231 and 232 and the second switch 234 connected to the capacitor (e.g., the second capacitor 264) having the smaller capacitance of the two second switches 233 and 234, as the switches for modulating the data and, based on the modulation of the data indicating the CEP value, controlling on/off of a first switch 232 connected to a capacitor (e.g., the first capacitor 262) having a smaller capacitance of the two first switches 231 and 232 and a second switch 234 connected to a capacitor (e.g., the second capacitor 264) having a smaller capacitance of the two second switches 233 and 234.

According to various embodiments of the disclosure, selecting the switches for modulating the data may include, in response to identifying that the absolute value of the CEP value is less than a first threshold, selecting a first switch connected to a capacitor having a smallest capacitance among the plurality of first switches 231 and 232 and a second switch connected to a capacitor having a smallest capacitance among the plurality of second switches 233 and 234, as the switches for modulating the data.

The wireless power reception device and the wireless power transmission device according to various embodiments of the disclosure may be various types of devices. The wireless power reception device and the wireless power transmission device may include, for example, a portable communication device (e.g., a smal tphone), a computer device, a portable multimedia device, a portable medical device, a camera, a wearable device, or a home appliance. The wireless power reception device and the wireless power transmission device according to an embodiment of the disclosure are not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the wireless power transmission device 101). For example, a processor (e.g., the processor 120) of the machine (e.g., the wireless power transmission device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smal tphones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. Some of the plurality of entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wireless power reception device comprising:
a resonance circuit configured to receive wireless power from a wireless power transmission device;
a plurality of first capacitors;
a plurality of first switches;
a plurality of second capacitors;
a plurality of second switches;
a rectification circuit connected to a first end and a second end of the resonance circuit; and
a control circuit connected to the rectification circuit,
wherein each of first ends of the plurality of first capacitors is connected to the first end of the resonance circuit, second ends of the plurality of first capacitors are respectively connected to first ends of the plurality of first switches, and second ends of the plurality of first switches are connected to a ground,
wherein each of first ends of the plurality of second capacitors is connected to the second end of the resonance circuit, second ends of the plurality of second capacitors are respectively connected to first ends of the plurality of second switches, and second ends of the plurality of second switches are connected to the ground, and
wherein the control circuit is configured to:
select switches for modulating data to be transmitted to the wireless power transmission device among the plurality of first switches and the plurality of second switches based on a control error packet (CEP) value identified based on an output voltage of the rectification circuit of the wireless power reception device, the CEP value being based on a scaled difference between a target output voltage of the rectification circuit and an actual output voltage of the rectification circuit, and
control on/off switching of the selected switches to modulate the data to transmit to the wireless power transmission device,
wherein a first subset of the plurality of first switches and the plurality of second switches is selected when the CEP value is smaller than a first threshold and a different, second subset of the plurality of first switches and the plurality of second switches is selected when the CEP value is greater than or equal to the first threshold.

2. The wireless power reception device of claim 1, wherein the control circuit is further configured to:
wait for a predetermined period after controlling the on/off switching of the selected switches to modulate the data to transmit to the wireless power transmission device, and
re-identify the CEP value after the predetermined period elapses.

3. The wireless power reception device of claim 1, wherein the plurality of first capacitors include two first capacitors,
wherein the plurality of second capacitors include two second capacitors,
wherein the plurality of first switches include two first switches,
wherein the plurality of second switches include two second switches, and
wherein the control circuit is further configured to, when selecting switches for modulating the data from among the plurality of first switches and the plurality of second switches:
select a first switch connected to a capacitor, which has a smaller capacitance among the two first capacitors, of the two first switches and a second switch connected to a capacitor, which has a smaller capacitance among the two second capacitors, of the two second switches,
select a first switch connected to a capacitor, which has a larger capacitance among the two first capacitors, of the two first switches and a second switch connected to a capacitor, which has a larger capacitance among the two second capacitors, of the two second switches, or
select all of the two first switches and the two second switches.

4. The wireless power reception device of claim 3, wherein the control circuit is further configured to select the first switch connected to the capacitor having the smaller capacitance of the two first switches and the second switch connected to the capacitor having the smaller capacitance of the two second switches, as the switches for modulating the data, in response to identifying that an absolute value of the CEP value is smaller than the first threshold.

5. The wireless power reception device of claim 4, wherein the control circuit is further configured to select the first switch connected to the capacitor having the larger capacitance of the two first switches and the second switch connected to the capacitor having the larger capacitance of the two second switches, as the switches for modulating the data, in response to a number of times in which the absolute value of the CEP value is identified as the first threshold or more being a first number or more.

6. The wireless power reception device of claim 5, wherein the control circuit is further configured to, in response to identifying that the absolute value of the CEP value is a second threshold or less in a state in which the first switch connected to the capacitor having the larger capacitance of the two first switches and the second switch connected to the capacitor having the larger capacitance of the two second switches are selected as the switches for modulating the data, select the first switch connected to the capacitor having the smaller capacitance of the two first switches and the second switch connected to the capacitor having the smaller capacitance of the two second switches, as the switches for modulating the data.

7. The wireless power reception device of claim 5, wherein the control circuit is further configured to, in response to identifying that a number of times in which the absolute value of the CEP value is identified as a second threshold or more is a second number or more in a state in which the first switch connected to the capacitor having the larger capacitance of the two first switches and the second switch connected to the capacitor having the larger capacitance of the two second switches are selected as the switches for modulating the data, select all of the two first switches and the two second switches as the switches for modulating the data.

8. The wireless power reception device of claim 7, wherein the control circuit is further configured to, in response to identifying that the absolute value of the CEP value is less than the second threshold in a state where both all of the two first switches and the two second switches are selected as the switches for modulating the data, select the first switch connected to the capacitor having the smaller capacitance of the two first switches and the second switch connected to the capacitor having the smaller capacitance of the two second switches, as the switches for modulating the data.

9. The wireless power reception device of claim 1, wherein the control circuit is further configured to, in response to identifying that the CEP value is less than the first threshold, select a first switch connected to a capacitor, which has a smallest capacitance among the plurality of first capacitors, among the plurality of first switches and a second switch connected to a capacitor, which has a smallest capacitance among the plurality of second capacitors, among the plurality of second switches, as the switches for modulating the data.

10. The wireless power reception device of claim 1, wherein the control circuit is configured to, in response to identifying that the CEP value is less than a second threshold in a state in which the selected switches differ from a combination of a first switch connected to a first capacitor, which has a smallest capacitance among the plurality of first capacitors, among the plurality of first switches and a second switch connected to a second capacitor, which has a smallest capacitance among the plurality of second capacitors, among the plurality of second switches, select the first switch connected to the first capacitor having the smallest capacitance among the plurality of first switches and the second switch connected to the second capacitor having the smallest capacitance among the plurality of second switches, as the switches for modulating the data.

11. The wireless power reception device of claim 1, wherein the modulated data indicates the CEP value.

12. A method performed by a wireless power reception device including a resonance circuit, a rectification circuit connected to a first end and a second end of the resonance circuit, a plurality of first capacitors, a plurality of first switches, a plurality of second capacitors, and a plurality of second switches, wherein each of first ends of the plurality of first capacitors is connected to the first end of the resonance circuit, second ends of the plurality of first capacitors are respectively connected to first ends of the plurality of first switches, and second ends of the plurality of first switches are connected to a ground, wherein each of first ends of the plurality of second capacitors is connected to the second end of the resonance circuit, second ends of the plurality of second capacitors are respectively connected to first ends of the plurality of second switches, and second ends of the plurality of second switches are connected to the ground, the method comprising:
identifying a control error packet (CEP) value based on an output voltage of the rectification circuit of the wireless power reception device;
selecting switches for modulating data to be transmitted to a wireless power transmission device among the plurality of first switches and the plurality of second switches based on the CEP value, the CEP value being based on a scaled difference between a target output voltage of the rectification circuit and an actual output voltage of the rectification circuit; and
controlling on/off switching of the selected switches to modulate the data to transmit to the wireless power transmission device,
wherein a first subset of the plurality of first switches and the plurality of second switches is selected when the CEP value is smaller than a first threshold and a different, second subset of the plurality of first switches and the plurality of second switches is selected when the CEP value is greater than or equal to the first threshold.

13. The method of claim 12, further comprising:
waiting for a predetermined period after controlling the on/off switching of the selected switches to modulate the data to transmit to the wireless power transmission device; and
re-identifying the CEP value after the predetermined period elapses.

14. The method of claim 12,
wherein the plurality of first capacitors include two first capacitors,
wherein the plurality of second capacitors include two second capacitors,
wherein the plurality of first switches include two first switches,
wherein the plurality of second switches include two second switches, and
wherein the selecting of the switches for modulating the data includes one of:
selecting a first switch connected to a capacitor, which has a smaller capacitance among the two first capacitors, of the two first switches and a second switch connected to a capacitor, which has a smaller capacitance among the two second capacitors, of the two second switches;
selecting a first switch connected to a capacitor, which has a larger capacitance among the two first capacitors, of the two first switches and a second switch connected to a capacitor, which has a larger capacitance among the two second capacitors, of the two second switches; or
selecting all of the two first switches and the two second switches.

15. The method of claim 14, wherein the selecting of the switches for modulating the data includes selecting the first switch connected to the capacitor having the smaller capacitance of the two first switches and the second switch connected to the capacitor having the smaller capacitance of the two second switches, as the switches for modulating the data, in response to identifying that an absolute value of the CEP value is smaller than the first threshold.

16. The method of claim 15, further comprising:
selecting the first switch connected to the capacitor having the larger capacitance of the two first switches and the second switch connected to the capacitor having the larger capacitance of the two second switches, as the switches for modulating the data, in response to a number of times in which the absolute value of the CEP value is identified as the first threshold or more being a first number or more.

17. The method of claim 16, further comprising:
in response to identifying that the absolute value of the CEP value is a second threshold or less in a state in which the first switch connected to the capacitor having the larger capacitance of the two first switches and the second switch connected to the capacitor having the larger capacitance of the two second switches are selected as the switches for modulating the data, selecting the first switch connected to the capacitor having the smaller capacitance of the two first switches and the second switch connected to the capacitor having the smaller capacitance of the two second switches, as the switches for modulating the data.

18. The method of claim 16, further comprising:

in response to identifying that a number of times in which the absolute value of the CEP value is identified as a second threshold or more is a second number or more in a state in which the first switch connected to the capacitor having the larger capacitance of the two first switches and the second switch connected to the capacitor having the larger capacitance of the two second switches are selected as the switches for modulating the data, selecting all of the two first switches and the two second switches as the switches for modulating the data.

19. The method of claim 18, further comprising:

in response to identifying that the absolute value of the CEP value is less than the second threshold in a state where both all of the two first switches and the two second switches are selected as the switches for modulating the data, selecting the first switch connected to the capacitor having the smaller capacitance of the two first switches and the second switch connected to the capacitor having the smaller capacitance of the two second switches, as the switches for modulating the data.

* * * * *